(12) United States Patent
Kawai et al.

(10) Patent No.: US 11,213,908 B2
(45) Date of Patent: Jan. 4, 2022

(54) WIRE FEEDING DEVICE, ARC WELDING DEVICE AND WIRE FEEDING METHOD

(71) Applicant: DAIHEN Corporation, Osakai (JP)

(72) Inventors: Hirokazu Kawai, Osaka (JP); Futoshi Nishisaka, Osaka (JP); Haruhiko Manabe, Osaka (JP); Kazutoshi Nagami, Osaka (JP); Masahiro Inoue, Osaka (JP); Hisao Miyahara, Osaka (JP); Akio Yoshinaga, Osaka (JP)

(73) Assignee: DAIHEN Corporation, Osaka (JP)

(*) Notice: Subject to any disclaimer, the term of this patent is extended or adjusted under 35 U.S.C. 154(b) by 307 days.

(21) Appl. No.: 16/250,577

(22) Filed: Jan. 17, 2019

(65) Prior Publication Data
US 2019/0224772 A1   Jul. 25, 2019

(30) Foreign Application Priority Data

Jan. 24, 2018 (JP) .............................. JP2018-009814

(51) Int. Cl.
*B23K 9/12* (2006.01)
*B23K 9/133* (2006.01)
(Continued)

(52) U.S. Cl.
CPC ............ *B23K 9/125* (2013.01); *B23K 9/0953* (2013.01); *B23K 9/133* (2013.01); *B23K 9/1336* (2013.01);
(Continued)

(58) Field of Classification Search
CPC .. B23K 9/0953; B23K 9/1012; B23K 9/1062; B23K 9/1075; B23K 9/124; B23K 9/125; B23K 9/133; B23K 9/173
See application file for complete search history.

(56) References Cited

U.S. PATENT DOCUMENTS 6,831,251 B1   12/2004   Artelsmair et al.
7,102,099 B2   9/2006    Huismann et al.
(Continued)

FOREIGN PATENT DOCUMENTS

CN   204018991 U   12/2014
CN   104661781 A   5/2015
(Continued)

OTHER PUBLICATIONS

Extended European Search Report for European Patent Application No. 19153217.5, dated Jul. 30, 2019, 9 pages.
(Continued)

*Primary Examiner* — Erin E McGrath
(74) *Attorney, Agent, or Firm* — Rudy J. Ng; Bret E. Field; Bozicevic, Field & Francis LLP

(57) ABSTRACT

The wire feeding device that feeds welding wire W from the wire source to the welding torch is disposed between the wire source and the welding torch and is configured to temporarily accommodate the welding wire W fed from the wire source and to feed the accommodated welding wire W to the welding torch. In the case where feeding of welding wire W is abnormally stopped, if the acceptance unit accepts instructions for increasing or decreasing, the wire feeding device controls the speed of feeding welding wire W fed by the first feeding part or the second feeding part so that a difference is generated in the feeding speed of the first feeding part and the second feeding part and the accommodated amount of welding wire W is in a range from the lower limit of normal to an upper limit of normal.

7 Claims, 14 Drawing Sheets

(51) Int. Cl.
*B23K 9/095* (2006.01)
*B65H 51/30* (2006.01)
*B65H 51/20* (2006.01)
*B65H 51/10* (2006.01)

(52) U.S. Cl.
CPC ............ *B65H 51/10* (2013.01); *B65H 51/20* (2013.01); *B65H 51/30* (2013.01); *B65H 2701/36* (2013.01)

(56) References Cited

U.S. PATENT DOCUMENTS

| | | | |
|---|---|---|---|
| 8,704,132 B2 | 4/2014 | Artelsmair et al. | |
| 2004/0011776 A1 | 1/2004 | Mukai et al. | |
| 2004/0016737 A1* | 1/2004 | Huismann | B23K 9/125 |
| | | | 219/137 PS |
| 2006/0037952 A1* | 2/2006 | Myers | B23K 9/1062 |
| | | | 219/130.51 |
| 2006/0124622 A1* | 6/2006 | Hubinger | B23K 9/124 |
| | | | 219/137.31 |
| 2007/0164074 A1* | 7/2007 | Schorghuber | B23K 9/133 |
| | | | 226/108 |
| 2017/0165779 A1* | 6/2017 | Barhorst | B23K 9/095 |

FOREIGN PATENT DOCUMENTS

| | | |
|---|---|---|
| CN | 106735769 A | 5/2017 |
| DE | 4320405 A1 | 12/1994 |
| JP | S55-77980 A | 6/1980 |
| JP | S60-184470 A | 9/1985 |
| JP | H10-6057 A | 1/1998 |
| JP | 2003-039169 A | 2/2003 |
| JP | 2006-326679 A | 12/2006 |
| JP | 2010-207876 A | 9/2010 |
| JP | 2015-058469 A | 3/2015 |
| WO | WO2014013322 A2 | 1/2014 |
| WO | WO2017155041 A1 | 9/2017 |

OTHER PUBLICATIONS

Office Action dated Aug. 13, 2021, issued in the Chinese Patent Application No. 201910055694.1, 8 pages.

* cited by examiner

WIRE FEEDING DEVICE, ARC WELDING DEVICE AND WIRE FEEDING METHOD

CROSS-REFERENCE TO RELATED APPLICATIONS

This Nonprovisional application claims priority under 35 U.S.C. § 119(a) on Patent Application No. 2018-009814 filed in Japan on Jan. 24, 2018, the entire contents of which are hereby incorporated by reference.

FIELD

The present disclosure relates to a wire feeding device that feeds welding wire to a welding torch, an arc welding device and a wire feeding method.

BACKGROUND

An arc welding system of a consumable electrode type is provided with: a wire feeding device that feeds welding wire from a wire source such as a wire reel and a pack wire to a welding torch; and a power supply device. The wire feeding device of a push-pull type is provided with a push feeder that pushes out welding wire from a wire source to a welding torch side, and a pull feeder that is located at an arm or the like of a welding robot and that pulls in the welding wire pushed out by the push feeder to feed it to the welding torch (Japanese Patent Application Laid-Open No. 2003-39169, for example). Generally, the push feeder is torque-controlled, whereas the pull feeder is speed-controlled.

Japanese Patent Application Laid-Open No. 2015-58469 discloses a wire feeding device provided with a wire buffer between a push feeder and a pull feeder, to buffer the welding wire of a prescribed amount or more so as to stably feed the welding wire.

In Japanese Patent Application Laid-Open Nos. 2003-39169 and 2015-58469, however, the wire between the push feeder and the pull feeder may greatly be loosened or stretched by the rollers of the push feeder or pull feeder slipping and so forth. Significant increase or decrease in the buffer amount of welding wire may affect weldability. Abnormality occurring in the buffer amount of welding wire abnormally stops the feeding of welding wire.

Moreover, at the time when the welding wire is being fed at high speed, a slight shift in the timing of starting and stopping rotation of the motor between the push feeder and the pull feeder may greatly affect the buffer amount of welding wire. Abnormality occurring in the buffer amount abnormally stops the feeding of welding wire.

SUMMARY

If the feeding of welding wire is abnormally stopped due to abnormality in the buffer amount, the buffer amount between the push feeder and the pull feeder needs to be returned to an appropriate value by, for example, manually winding the welding wire.

An object of the present disclosure relates to a wire feeding device, an arc welding device and a wire feeding method that are capable of restoring a device which had been stopped abnormally, only by giving instructions to increase or decrease the accommodated amount of welding wire, in the case where the feeding of the welding wire is abnormally stopped due to abnormality in the accommodated amount of welding wire in a wire buffer located between a wire source and a welding torch.

A wire feeding device according to the present disclosure that feeds welding wire from a wire source to a welding torch comprises: a wire buffer that is configured to temporarily accommodates welding wire fed from the wire source, and that feeds the accommodated welding wire to the welding torch; a first feeding part that feeds the welding wire from the wire source to the wire buffer; a second feeding part that feeds the welding wire accommodated in the wire buffer to the welding torch; a detection unit that detects the accommodated amount of welding wire accommodated in the wire buffer; a feed control unit that controls the speed of welding wire fed by the first feeding part and the second feeding part so that a predetermined amount of welding wire is accommodated into the wire buffer based on the detection result of the detection unit; a stop control unit that stops the feeding of welding wire if the accommodated amount of welding wire is more than an upper limit of normal which is larger than the predetermined amount, or if the accommodated amount of welding wire is less than a lower limit of normal which is smaller than the predetermined amount; and an acceptance unit that accepts instructions for increasing or decreasing the accommodated amount of welding wire in the case where the feeding of welding wire is abnormally stopped. The feed control unit controls, in the case where the acceptance unit accepts the instructions for increasing or decreasing, the speed of feeding the welding wire fed by the first feeding part or the second feeding part so that a difference is generated in the feeding speed of the first feeding part and the second feeding part and that the accommodated amount of welding wire is in a range from a lower limit of normal to an upper limit of normal.

According to an aspect of the present disclosure, the wire feeding device is provided with a wire buffer located between a wire source and a welding torch. The wire buffer temporarily accommodates a predetermined amount of welding wire, and feeds the accommodated welding wire to the welding torch.

More specifically, the first feeding part feeds the welding wire from the wire source to the wire buffer. The second feeding part feeds the welding wire accommodated in the wire buffer to the welding torch. The feed control unit detects at the detection unit an amount of welding wire accommodated in the wire buffer, and controls the speed of the first feeding part and the second feeding part so that the amount of welding wire is a predetermined amount.

Such a wire buffer may more stably feed the welding wire compared to the case where the welding wire is fed from the wire source directly to the welding torch.

Meanwhile, if the amount of welding wire accommodated in the wire buffer exceeds an upper limit of normal due to some abnormality, or if it is below a lower limit of normal, the feeding of welding wire is abnormally stopped. If the feeding of welding wire is abnormally stopped, the acceptance unit accepts the instructions for increasing or decreasing the accommodated amount of welding wire. If the acceptance unit accepts the instructions for increasing or decreasing, the feed control unit controls the speed of feeding the welding wire by the first feeding part or the second feeding part so that the accommodated amount of welding wire is in a range from a lower limit of normal to an upper limit of normal.

Accordingly, the user may adjust the accommodated amount of welding wire in the wire buffer only by giving instructions for increasing or decreasing to the acceptance unit.

When the accommodated amount is increased or decreased, one of the first feeding part and the second feeding part may be activated or both of the first feeding part and the second feeding part may be activated.

In the wire feeding device according to an aspect of the present disclosure, in the case where the feeding of welding wire is abnormally stopped and the acceptance unit accepts the instructions for increasing or decreasing, if the accommodated amount of welding wire is less than the lower limit of normal, the feed control unit stops the second feeding part and controls the feeding performed by the first feeding part so that the welding wire is fed to the wire buffer, and if the accommodated amount of welding wire is more than the upper limit of normal, the feed control unit stops the second feeding part and controls the feeding performed by the first feeding part so that the welding wire is fed back to the wire source side from the wire buffer.

According to the present aspect, in the case where the feeding of welding wire is abnormally stopped, if the accommodated amount of welding wire is less than the lower limit of normal, the feed control unit controls the feeding performed by the first feeding part so that the welding wire is fed to the wire buffer while the second feeding part remains stopped. Accordingly, the accommodated amount of welding wire in the wire buffer is increased.

In the case where the feeding of welding wire is abnormally stopped, if the accommodated amount of welding wire is more than the upper limit of normal, the feed control unit controls the feeding performed by the first feeding part so that the welding wire is fed from the wire buffer to the wire source while the second feeding part is being stopped. Accordingly, the accommodated amount of welding wire in the wire buffer is decreased.

Moreover, as the second feeding part is stopped, changes in the state of welding wire at positions from the second feeding part to the welding torch side, such as a change in the wire protruding length, may be prevented.

In the wire feeding device according to an aspect of the present disclosure, the acceptance unit successively accepts the instructions for increasing or decreasing, and if the feeding of welding wire is abnormally stopped, the feed control unit controls the feeding of welding wire by the first feeding part or the second feeding part during a period when the acceptance unit is accepting the instructions for increasing or decreasing, and stops the first feeding part and the second feeding part when the acceptance unit is not accepting the instructions for increasing or decreasing.

According to the present aspect, the acceptance unit successively accepts instructions for increasing or decreasing. The feed control unit controls increase or decrease of the accommodated amount of the wire buffer only during a period when the acceptance unit is accepting the instructions for increasing or decreasing. In the case where the acceptance unit is not accepting the instructions for increasing or decreasing, the first feeding part and the second feeding part are stopped.

In the wire feeding device according to an aspect of the present disclosure, the feed control unit stops feeding of welding wire by the first feeding part and the second feeding part if the accommodated amount of welding wire is a second predetermined amount which is in a range from the lower limit of normal to the upper limit of normal after the feeding of welding wire is abnormally stopped.

According to the present aspect, in the case where the accommodated amount reaches the second predetermined amount as a result of increasing or decreasing the accommodated amount of welding wire, the feeding of welding wire by the first feeding part and the second feeding part is stopped. That is, adjustment of the accommodated amount of welding wire is finished. The second predetermined amount corresponds to the accommodated amount of welding wire that can restore the abnormally-stopped wire feeding device and that can normally restart the feeding of welding wire.

The wire feeding device according to an aspect of the present disclosure comprises: a cancellation acceptance unit that accepts cancellation of abnormal stop; and a cancellation control unit that cancels, in the case where cancellation is accepted by the cancellation acceptance unit, the stopped state caused by the stop control unit if the accommodated amount of welding wire is the second predetermined amount which is in the range from the lower limit of normal to the upper limit of normal.

According to the present aspect, in the case where the accommodated amount reaches the second predetermined amount as a result of increasing or decreasing the accommodated amount of welding wire, if the cancellation acceptance unit accepts cancellation of abnormal stopping, the abnormally stopped state is canceled.

The wire feeding device according to an aspect of the present disclosure comprises an abnormality resolution reporting unit that reports resolution of abnormality if the accommodated amount of welding wire reaches the second predetermined amount which is in a range from the lower limit of normal to the upper limit of normal after the feeding of the welding wire is abnormally stopped.

According to the present aspect, if the accommodated amount reaches the second predetermined amount as a result of increasing or decreasing the accommodated amount of welding wire, the abnormality resolution reporting unit reports resolution of abnormality. The user may recognize that the accommodated amount of welding wire in the wire buffer reaches an appropriate value.

In the wire feeding device according to an aspect of the present disclosure, the second predetermined amount is in a range from a lower limit of the predetermined amount to an upper limit of the predetermined amount.

According to the present aspect, the second predetermined amount is in a range of a predetermined amount. That is, the second predetermined amount is within a range of an amount of wire to be accommodated in the wire buffer at the time of normal operation. Accordingly, the wire feeding device that has been stopped abnormally may stably be restored. The second predetermined amount may be the same as the predetermined amount described above.

The wire feeding device according to an aspect of the present disclosure comprises an accommodated amount reporting unit that reports the accommodated amount of welding wire in the case where the feeding of welding wire is abnormally stopped.

According to the present aspect, if the feeding of welding wire is abnormally stopped, the accommodated amount reporting unit reports the accommodated amount of welding wire in the wire buffer. The user may adjust the accommodated amount in the wire buffer while checking it.

The arc welding device according to an aspect of the present disclosure comprises: the wire feeding device according to any one of the aspects described above; and a power supply device that supplies welding current to the welding wire to be fed to a base material by the wire feeding device.

According to the present aspect, in the case where the wire feeding device constituting the arc welding device is abnormally stopped, the accommodated amount of welding wire in the wire buffer may be adjusted only by giving instructions for increasing or decreasing to the acceptance unit.

In the arc welding device according to the present disclosure, the power supply device includes the first power supply and the second power supply that are connected in parallel, the feed control unit includes a first control unit that is located at the first power supply and that controls the speed of feeding performed by the first feeding part, and a second control unit that is located at the second power supply and that controls the speed of feeding performed by the second feeding part. The first power supply and the second power supply perform communication to control the speed of feeding of welding wire by the first and second feeding parts.

According to the present disclosure, the power supply device includes at least two power supplies, i.e. the first power supply and the second power supply, which are connected in parallel. The first control unit located at the first power supply controls the speed for the first feeding part, whereas the second control unit located at the second power supply controls the speed for the second feeding part. The first power supply and the second power supply perform communication to control the speed for the first and second feeding parts.

Accordingly, even in the configuration where each of the power supplies is provided with only one port for outputting a command for speed to the first feeding part or the second feeding part, the speed of feeding the welding wire by both the first feeding part and the second feeding part may be controlled.

A wire feeding method according to an aspect of the present disclosure that feeds welding wire from a wire source to a welding torch comprises: preparing a wire buffer that is configured to temporarily accommodates the welding wire fed from the wire source, and that feeds the accommodated welding wire to the welding torch, a first feeding part that feeds the welding wire from the wire source to the wire buffer, and a second feeding part that feeds the welding wire accommodated in the wire buffer to the welding torch; detecting the accommodated amount of welding wire accommodated in the wire buffer; controlling the speed of welding wire fed by the first feeding part and the second feeding part so that a predetermined amount of welding wire is accommodated into the wire buffer, based on a detection result; stopping feeding of the welding wire if the accommodated amount of welding wire is more than an upper limit of normal which is larger than the predetermined amount, or if the accommodated amount of welding wire is less than a lower limit of normal which is smaller than the predetermined amount; accepting instructions for increasing or decreasing the accommodated amount of welding wire if feeding of the welding wire is stopped; and if the instructions for increasing or decreasing are accepted, controls the speed of feeding the welding wire by the first feeding part or the second feeding part so that a difference in the feeding speed is generated between the first feeding part and the second feeding part.

In the present aspect, if the wire feeding is abnormally stopped, the user may adjust the accommodated amount of welding wire in the wire buffer only by providing instructions for increasing or decreasing.

According to the present aspect, in the case where the feeding of welding wire is abnormally stopped due to abnormality in the accommodated amount of welding wire in the wire buffer disposed between the wire source and the welding torch, the abnormally-stopped device may be restored only by providing instructions for increasing or decreasing the accommodated amount of welding wire.

The above and further objects and features will more fully be apparent from the following detailed description with accompanying drawings.

DETAILED DESCRIPTION

The present disclosure will be described below in detail with reference to the drawings illustrating the embodiments thereof. At least some parts of the embodiments described below may arbitrarily be combined together.

Embodiment 1

Figure 1:
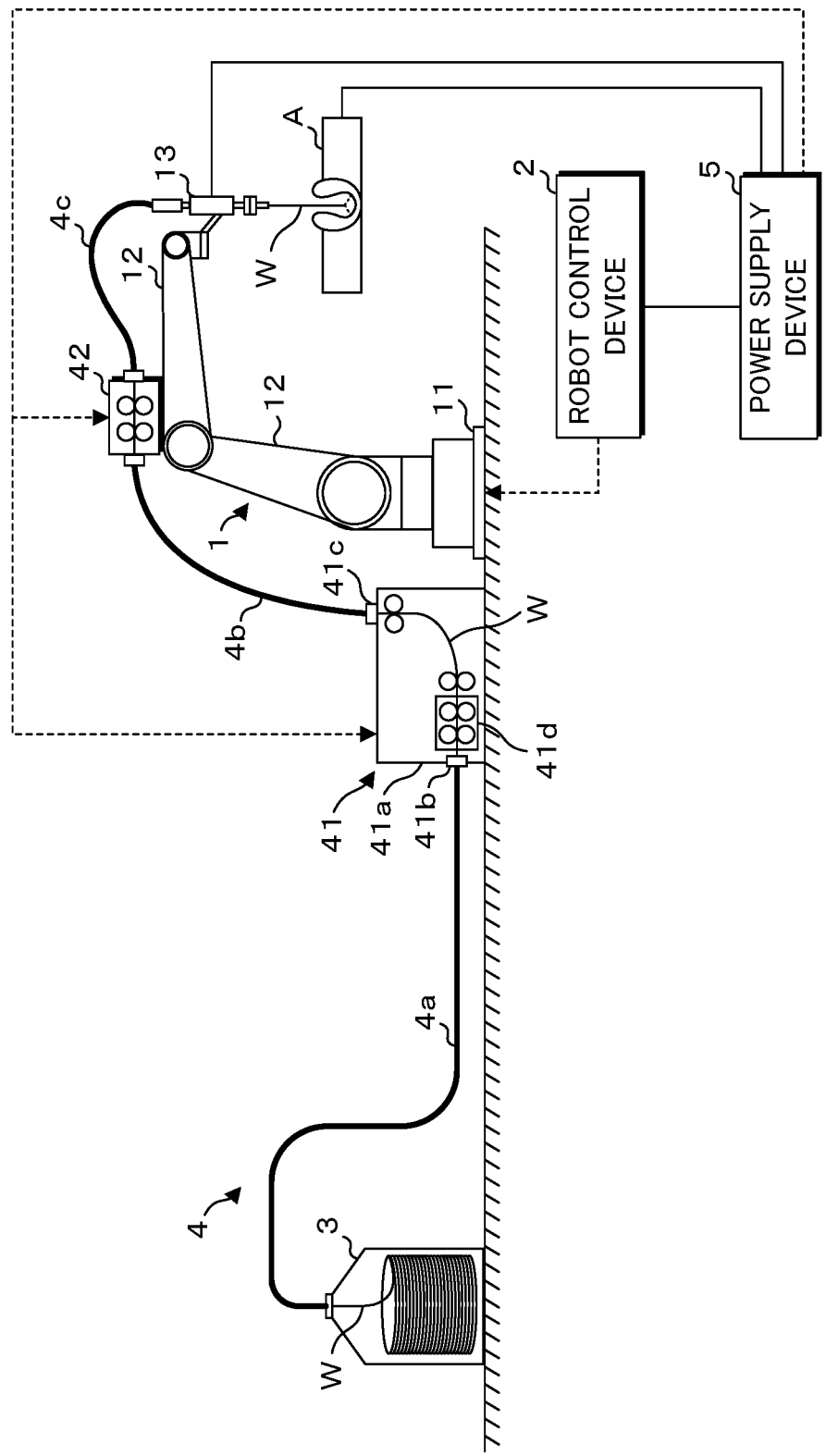
FIG. 1 is a schematic diagram illustrating a configuration example of an arc welding system according to Embodiment 1.

FIG. 1 is a schematic diagram illustrating a configuration example of an arc welding system according to Embodiment 1. An arc welding system according to the present embodiment is a gas shield arc welding machine of a consumable electrode type that includes a welding robot 1, a robot control device 2, a wire source 3, a wire feeding device 4 and a power supply device 5.

The welding robot 1 automatically performs arc welding of the base material A. The welding robot 1 includes a base 11 fixed to an appropriate position on a floor surface. To the base 11, multiple arms 12 are rotatably connected via a shaft (not illustrated). A welding torch 13 is held at the tip end of the arm 12 connected to the distal end side. A motor is provided at the connecting portion of the arms 12, to rotate the arms 12 around the shaft by the rotary drive force of the motor. The rotation of the motor is controlled by the robot control device 2. The robot control device 2 may move the welding torch 13 with respect to the base material A in the upper, lower, front, back, left and right directions by rotating the arms 12. Moreover, at the connecting portion of the arms 12, an encoder is located that outputs a signal indicating a rotated position of each arm 12 to the robot control device 2, which recognizes the position of the welding torch 13 based on the signal output from the encoder.

The welding torch 13 is made of conductive material such as copper alloy, and has a cylindrical contact chip which guides welding wire W to the base material A to be welded while supplying welding current required to generate arc. The contact chip makes contact with welding wire W penetrating into the contact chip, and supplies welding current to the welding wire W. Moreover, the welding torch 13 has a hollow cylindrical shape surrounding the contact chip, and has a nozzle for spraying shield gas to the base material A through an opening at the tip end. The shield gas is to prevent oxidation of the base material A melted by the arc as well as the welding wire W. The shield gas is, for example, carbon dioxide gas, mixed gas containing carbon dioxide gas and argon gas, or inert gas such as argon.

The wire source 3 accommodates the welding wire W so as to veer out the welding wire W to the welding torch 13. The welding wire W is, for example, a solid wire having a diameter of 0.8 mm to 1.6 mm, and functions as a consumable electrode. The wire source 3 is a pack wire accommodated in a pail pack while being helically wound, or a reel wire wound around a wire reel.

The wire feeding device 4 is provided with an wire buffer 41 that is disposed between the wire source 3 and the welding torch 13 and is configured to temporarily accommodate the welding wire W fed from the wire source 3 and to feed the accommodated welding wire W to the welding torch 13.

Figure 2:
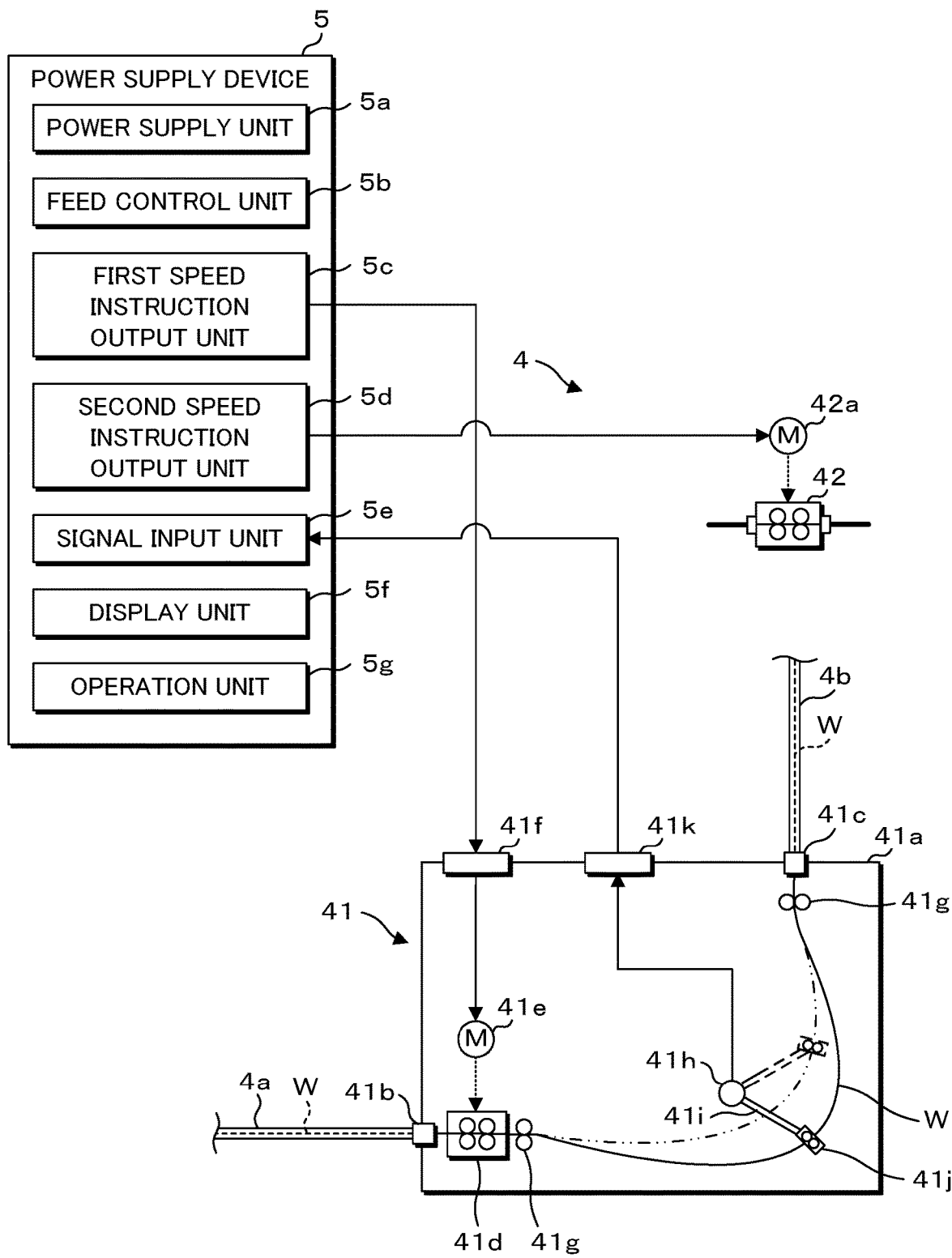
FIG. 2 is a schematic diagram illustrating a configuration example of a wire buffer and a power supply device according to Embodiment 1.

FIG. 2 is a schematic diagram illustrating a configuration example of the wire buffer 41 and the power supply device 5 according to Embodiment 1. The wire buffer 41 is to absorb the difference in the wire feeding speed between different parts in the feed path, and also to reduce the feeding load of the welding wire W on the welding torch 13 side. The wire buffer 41 has a hollow substantially-rectangular-parallelepiped housing 41a that accommodates the welding wire W. An inlet part 41b through which the welding wire W fed from the wire source 3 is introduced is formed on a side surface of the housing 41a, and an outlet part 41c through which the welding wire W accommodated inside the housing 41a is sent out is formed on an upper surface of the housing 41a. The welding wire W pulled into the housing 41a is accommodated in a state of being bent in an arc between the inlet part 41b and the outlet part 41c.

The wire source 3 and the inlet part 41b of the wire buffer 41 are connected via a first conduit cable 4a through which the welding wire W passes. At the inlet part 41b inside the housing 41a, a first feeding part 41d that pulls out the welding wire W from the wire source 3 and pushes the welding wire W into the housing 41a through the inlet part 41b. The first feeding part 41d has a pair of rollers that are opposed to each other at positions where the rollers can hold the welding wire W introduced through the inlet part 41b between them. At least one of the rollers is rotary driven by a first motor 41e which is capable of controlling the speed.

The first feeding part 41d may feed the welding wire W at a speed of 30-100 meters per minute, for example. The wire buffer 41 is provided with an input port 41f through which a speed instruction signal output from the power supply device 5 is input, and the first motor 41e rotates the rollers at a speed according to the speed instruction signal input to the input port 41f. The first motor 41e detects the rotation speed of the rollers by an encoder (not illustrated), for example, and operates so as to rotate the rollers at a rotation speed according to the speed instruction signal.

The welding wire W pulled into the housing 41a from the first conduit cable 4a through the inlet part 41b into the housing 41a is curved into an arbitrary shape, and a first predetermined amount of welding wire W is accommodated into the housing 41a. In the example illustrated in FIG. 2, the welding wire W is accommodated while being curved into an arc. A member for guiding the welding wire W may be provided inside the housing 41a so that the welding wire W is accommodated in a predetermined spatial area without being entangled. Guide rollers 41g, for example, are located at each of the inlet part 41b and the outlet part 41c inside the housing 41a. More specifically, the guide rollers 41g on the inlet part 41b side is disposed at the outlet side of the first feeding part 41d, and has a pair of rollers that are opposed to each other at positions where the rollers can hold the welding wire W between them and guide it from the inlet part 41b into the housing 41a. The guide rollers 41g on the outlet part 41c side has a pair of rollers opposed to each other at positions where the rollers can hold the welding wire W between them and guide it from an inside of the housing 41a to the outlet part 41c. It is noted that the guide rollers 41g may be configured to be rotary driven by a motor which rotates in synchronization with the first motor 41e, or be passively rotated.

Moreover, the wire feeding device 4 is provided with a second feeding part 42 that pulls out the welding wire W from the wire buffer 41 and feeds the pulled-out welding wire W to the welding torch 13. The second feeding part 42 is located, for example, at the arm 12 of the welding robot 1, as illustrated in FIG. 1. The second feeding part 42 is connected to the outlet part 41c of the wire buffer 41 by a second conduit cable 4b through which the welding wire W passes, and is connected to the welding torch 13 by a third conduit cable 4c. The wire buffer 41 is aligned with and in the vicinity of the welding robot 1. The second feeding part 42 has a pair of rollers that are opposed to each other at positions where the welding wire W may be held between them, and the rollers are rotated so as to pull out the welding wire W from the wire buffer 41 and feeds the pulled-out welding wire W to the welding torch 13. At least one of the rollers is rotary driven by a second motor 42a which is capable of controlling the speed. The second feeding part 42 may feed the welding wire W at a speed of 30-100 meters per minute, for example. The second feeding part 42 rotates the rollers based on a speed instruction signal output from the power supply device 5. The second motor 42a detects the rotation speed of the rollers by an encoder (not illustrated), for example, and operates so as to rotate the rollers at a rotation speed according to the speed instruction signal.

Furthermore, the wire buffer 41 is provided with an accommodated amount detection unit 41h that detects the accommodated amount of welding wire W. The accommodated amount detection unit 41h is provided with a rod member 41i with one end rotatably fixed thereto. At the other end of the rod member 41i, a pair of curvature detection rollers 41*j* that pinch the bent portion of the welding wire W are rotatably supported. If the accommodated amount of welding wire W is increased or decreased, the curvature of the welding wire W accommodated inside the housing 41*a* changes as illustrated by the two-dot chain lines in FIG. 2, and the rod member 41*i* pivots around the one end described above. The accommodated amount detection unit 41*h* is a rotary position sensor that detects the rotary position of the rod member 41*i*, and by detecting the rotary position of the rod member 41*i*, the accommodated amount detection unit 41*h* can detect the accommodated amount of welding wire W, and outputs a detection signal indicating the accommodated amount to the power supply device 5 via the output port 41*k*.

It is noted that the accommodated amount detection unit 41*h* provided with the rotary position sensor is a mere example, and the accommodated amount of welding wire W may be optically detected with the use of an infrared sensor or the like. Moreover, a limit switch which is in contact with the accommodated welding wire W and which is turned on or off in accordance with the accommodated amount of welding wire W may also be used to configure the accommodated amount detection unit 41*h*.

The power supply device 5 is connected to the contact tip of the welding torch 13 and the base material A via the power supply cable, and includes a power supply unit 5*a* that supplies welding current, a feed control unit 5*b* that controls the feeding speed of the welding wire W, and a first speed instruction output unit 5*c* as well as a second speed instruction output unit 5*d* that output speed instruction signals respectively to the first feeding part 41*d* and the second feeding part 42.

The power supply unit 5*a* is an insulating switching power supply, which performs AC/DC conversion on the alternating current into required direct current, and supplies the converted direct current to the load. More specifically, the power supply unit 5*a* includes a power supply circuit that outputs PWM-controlled direct current, a signal processing unit that controls the operation of the power supply circuit, a voltage detection unit, a current detection unit, and so forth. The voltage detection unit detects voltage applied to the welding torch 13 and the base material A, and outputs a voltage value signal indicating the detected voltage value to the signal processing unit. The current detection unit detects, for example, welding current supplied from the power supply device 5 to the welding wire W via the welding torch 13 and flows through the arc, and outputs a current value signal indicating the detected current value to the signal processing unit. The signal processing unit outputs a signal for PWM-controlling the power supply circuit to the power supply circuit, based on a voltage value signal, a current value signal, a set value for a welding condition and the like. The power supply circuit includes, for example, an AC-DC converter performing AC-DC conversion on commercial alternate current, an inverter circuit converting direct current subjected to AC-DC conversion into required alternate current by switching, and a rectification circuit rectifying the alternate current obtained by conversion. The power supply circuit performs PWM control on the inverter circuit in accordance with the signal output from the signal processing unit, and outputs predetermined welding current and voltage to the welding wire W. For example, welding voltage that varies periodically is applied between the base material A and the welding wire W, and the welding current flows. The power supply device 5 is configured to receive an input of an output instruction signal from the robot control device 2 via a control communication line. The power supply unit 5*a* starts supplying welding current to the power supply circuit using the output instruction signal as a trigger.

When the power supply unit 5*a* starts supplying the welding current, the feed control unit 5*b* causes the first speed instruction output unit 5*c* and the second speed instruction output unit 5*d* to output speed instruction signals indicating the feeding speed according to welding conditions to the first feeding part 41*d* and the second feeding part 42, respectively. In a normal operation state where welding is performed, the speed instruction signal to be output to the first feeding part 41*d* is substantially the same as the speed instruction signal to be output to the second feeding part 42. The first feeding part 41*d* and the second feeding part 42 feed the welding wire W at substantially the same speed. It is noted that the speed instruction signals to be output to the first feeding part 41*d* and the second feeding part 42 are not necessarily identical to each other, since a difference exists in the diameters of the rollers constituting the first feeding part 41*d* and the second feeding part 42. Substantially the same speed instruction signal includes signals that are different from each other within such a range that no problem of slipping, buckling or the like of the welding wire W occurs and that the first predetermined amount of welding wire W is accommodated in the wire buffer 41.

Moreover, as will be described later, abnormality occurs in the amount of welding wire W accommodated in the wire buffer 41, which stops the first feeding part 41*d* and the second feeding part 42. In the case where the accommodated amount of welding wire W is adjusted when the feeding of welding wire W is abnormally stopped, the speed instruction signal output to the first feeding part 41*d* is different from the speed instruction signal output to the second feeding part 42, and the first feeding part 41*d* and the second feeding part 42 feed the welding wire W at different speeds. The method of adjusting the accommodated amount includes a method of stopping the first feeding part 41*d* while operating the second feeding part 42, a method of stopping the second feeding part 42 while operating the first feeding part 41*d*, and a method of operating the first feeding part 41*d* and the second feeding part 42 at different feeding speeds. Embodiment 1 describes an example where the second feeding part 42 is stopped and only the first feeding part 41*d* is operated.

Furthermore, the power supply device 5 includes a signal input unit 5*e* to which a detection signal output from the wire buffer 41 is input, a display unit 5*f* on which an amount or the like of the welding wire W accommodated in the wire buffer 41 is displayed, and an operation unit 5*g* for accepting instructions for increasing or decreasing the accommodated amount, instructions for canceling an abnormally-stopped state, and so forth. The operation unit 5*g* is, for example, a touch panel.

In the normally-operated state, the power supply device 5 corrects the feeding speed indicated by speed instructions for the first feeding part 41*d* based on the detection signal input to the signal input unit 5*e*, and outputs the corrected speed instruction signal to the first feeding part 41*d*.

In the abnormally-stopped state, on the other hand, the power supply device 5 detects the amount of welding wire W accommodated in the wire buffer 41 based on the detection signal input to the signal input unit 5*e*, and outputs the speed instruction signals to the first feeding part 41*d* and the second feeding part 42 to adjust the accommodated amount.

<Deviation Control for Making the Accommodated Amount of Welding Wire Closer to Predetermined Amount>

Figure 3:
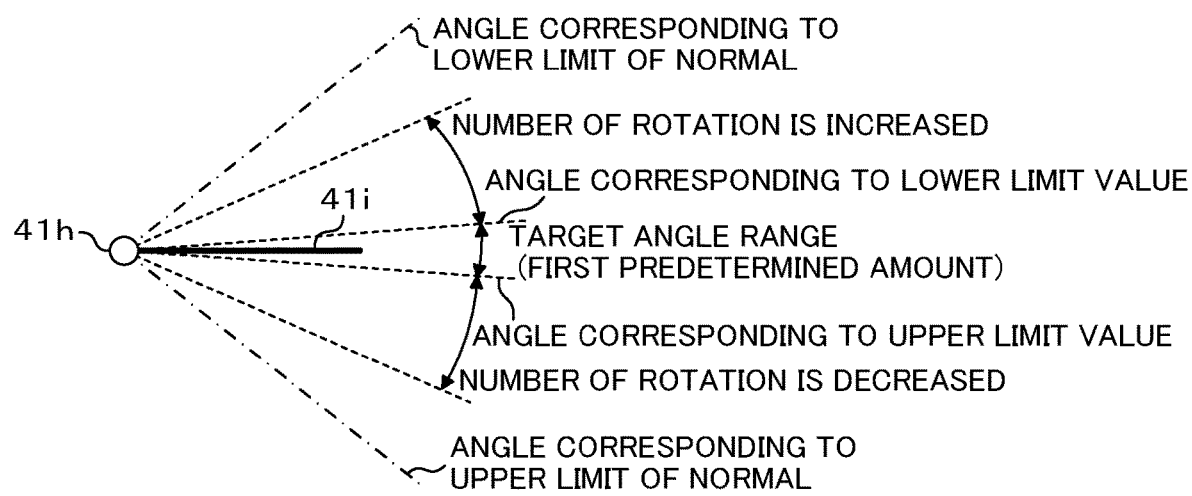
FIG. 3 is a schematic diagram illustrating a correction method for feeding speed.
Figure 4:
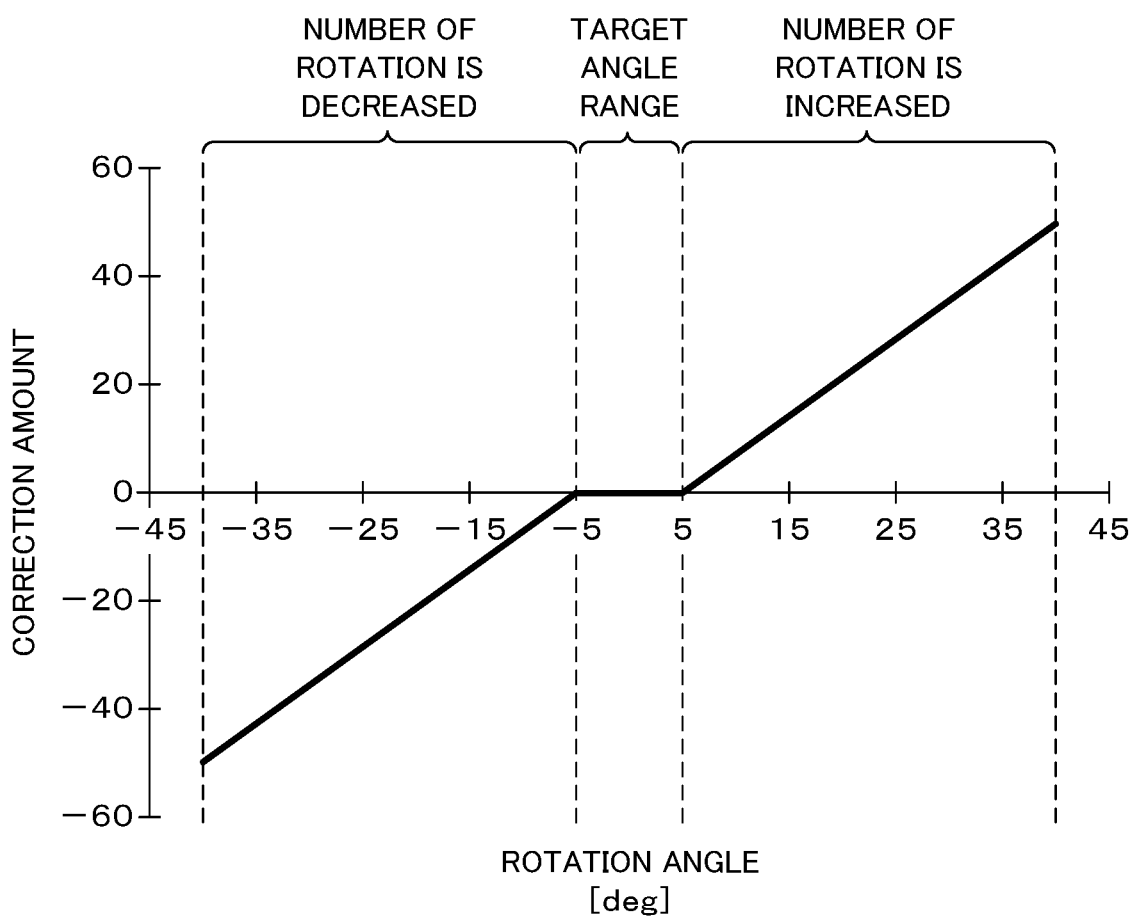
FIG. 4 is a graph illustrating the relationship between a rotation angle of a rod member detected by the accommodated amount detection unit and a correction amount for feeding speed.

FIG. 3 is a schematic view illustrating a method of correcting the feeding speed. FIG. 4 is a graph illustrating the relationship between the rotation angle of the rod member 41i detected by the accommodated amount detection unit 41h and the correction amount for feeding speed. In the graph illustrated in FIG. 4, the horizontal axis indicates the rotation angle of the rod member 41i, whereas the vertical axis indicates the correction amount of speed instructions.

As illustrated in FIG. 3, the rotation angle of the rod member 41i is increased or decreased according to the accommodated amount of welding wire W in the wire buffer 41. The rotation angle of the rod member 41i becomes smaller as the accommodated amount of welding wire W is increased (clockwise rotation in FIGS. 2 and 3), and becomes larger as the accommodated amount of welding wire W is decreased (counterclockwise rotation in FIGS. 2 and 3). The first predetermined amount of welding wire W is accommodated in the wire buffer 41. The first predetermined amount corresponds to the amount of welding wire W to be accommodated in the wire buffer 41, and has a lower limit value and an upper limit value. That is, the first predetermined amount allows a certain latitude. It is assumed that the rotation angle of the rod member 41i obtained when the accommodated amount of welding wire W corresponds to an intermediate value between the upper limit value and the lower limit value is 0 degrees. The target angle range as illustrated in FIG. 3 is a rotation angle of the rod member 41i corresponding to the first predetermined amount. The rotation angle of the rod member 41i corresponding to the upper limit value is −5 degrees, for example, and the rotation angle of the rod member 41i corresponding to the lower limit value is 5 degrees.

The feed control unit 5b increases the speed of feeding by the first feeding part 41d if the accommodated amount of welding wire W is smaller than the lower limit value, e.g., if the rotation angle of the rod member 41i is 5 degrees or larger. That is, the number of rotation of the rollers of the first feeding part 41d is increased. More specifically, the feed control unit 5b calculates a correction amount (%) proportional to the difference between the rotation angle of the rod member 41i detected by the accommodated amount detection unit 41h and an angle corresponding to the lower limit value. The feed control unit 5b then corrects the feeding speed of the first feeding part 41d by adding to the feeding speed a value obtained by multiplying the feeding speed before correction, i.e. the feeding speed of the second feeding part 42, by the correction amount (%). The feed control unit 5b outputs a speed instruction signal indicating the feeding speed after correction to the first feeding part 41d.

Likewise, the feed control unit 5b decreases the feeding speed of the first feeding part 41d if the accommodated amount of welding wire W is larger than the upper limit value, e.g., if the rotation angle of the rod member 41i is −5 degrees or smaller. That is, the number of rotation by the rollers of the first feeding part 41d is decreased. More specifically, the feed control unit 5b calculates a correction amount (%) proportional to the difference between the rotation angle of the rod member 41i detected by the accommodated amount detection unit 41h and an angle corresponding to the upper limit value. The feed control unit 5b then corrects the feeding speed of the first feeding part 41d by multiplying the feeding speed before correction, i.e. the feeding speed of the second feeding part 42, by a negative correction amount (%), and adding the value obtained by the multiplication to the feeding speed. The feed control unit 5b outputs a speed instruction signal indicating the feeding speed after correction to the first feeding part 41d.

If the accommodated amount of welding wire W is in a range from the lower limit value to the upper limit value, that is, if the rotation angle of the rod member 41i is within a target angle range, the feed control unit 5b performs no correction of feeding speed according to the rotation angle. In other words, the feed control unit 5b performs no deviation control based on the difference between the rotation angle of the rod member 41i and a target angle, e.g., 0 degrees.

<Abnormal Stop Control>

The lower limit of normal and the upper limit of normal illustrated in FIG. 3 represent the accommodated amount of welding wire W accommodated in the wire buffer 41, indicating the range which cannot possibly hinder welding. If the amount of welding wire W accommodated in the wire buffer 41 is below the lower limit of normal or above the upper limit of normal, an adverse effect may be caused in weldability. The feed control unit 5b thus abnormally stops feeding of welding wire W.

<Stabilization Control Based on Change Rate of Rotation Angle of Rod Member>

Figure 5:
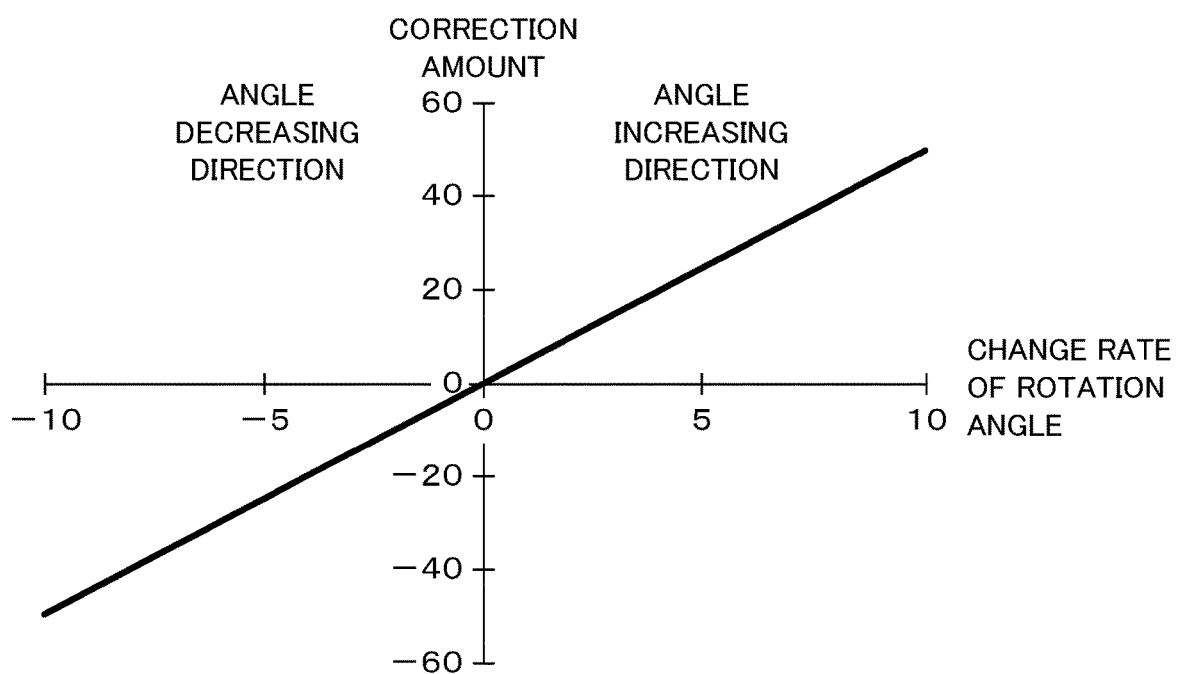
FIG. 5 is a graph illustrating the relationship between a change rate in the rotation angle of a rod member detected by the accommodated amount detection unit and a correction amount for feeding speed.

FIG. 5 is a graph illustrating the relationship between the change rate in the rotation angle of a rod member 41i detected by the accommodated amount detection unit 41h and the correction amount for feeding speed. In the graph illustrated in FIG. 5, the horizontal axis indicates the change rate of the rotation angle of the rod member 41i, whereas the vertical axis indicates the correction amount of speed instructions. If the accommodated amount of welding wire W in the wire buffer 41 is in the range of the first predetermined amount, the feed control unit 5b corrects the feeding speed of welding wire W fed by the first feeding part 41d in accordance with the change rate of the accommodated amount. More specifically, the correction amount proportional to the change rate of the rotation angle of the rod member 41i is calculated. The feed control unit 5b then corrects the feeding speed of the first feeding part 41d by adding to the feeding speed a value obtained by multiplying the feeding speed before correction, i.e. the feeding speed of the first feeding part 41d, by the correction amount (%). The feed control unit 5b outputs a speed instruction signal indicating the feeding speed after correction to the first feeding part 41d.

<Processing Procedure>

A processing procedure concerning the feeding speed control for the welding wire W and abnormal stopping and restoring will now be described.

Figure 6:
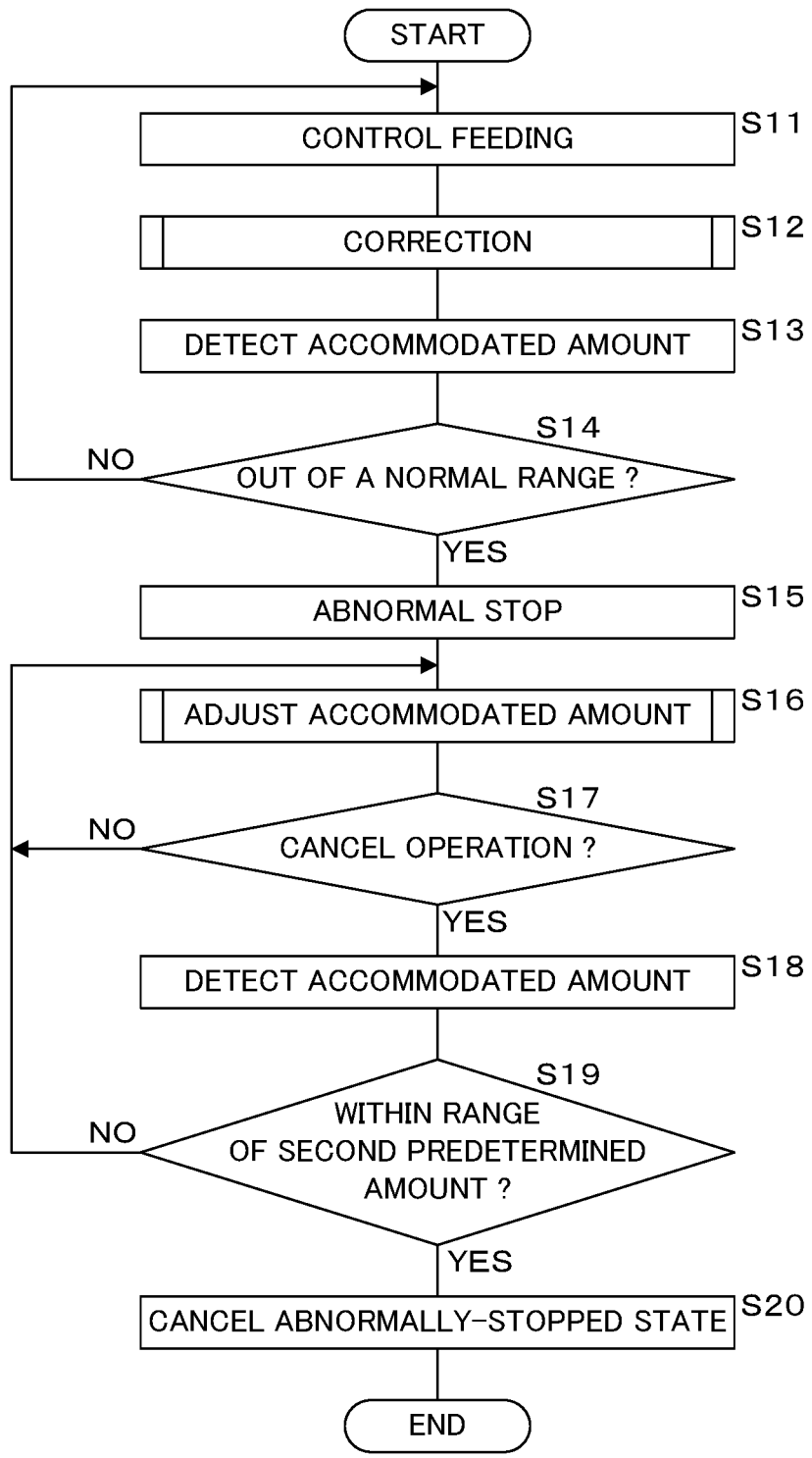
FIG. 6 is a flowchart illustrating a processing procedure of a feed control unit according to Embodiment 1.

FIG. 6 is a flowchart illustrating a processing procedure of the feed control unit 5b. The feed control unit 5b causes the first speed instruction output unit 5c and the second speed instruction output unit 5d to output speed instruction signals indicating the feeding speed according to a welding condition to the first feeding part 41d and the second feeding part 42, respectively, to control the speed of feeding by the first feeding part 41d and the second feeding part 42 (step S11). The feed control unit 5b controls the speed of feeding the welding wire W by the first feeding part 41d and the second feeding part 42 so that the feeding speed is equal to each other. Subsequently, the feed control unit 5b executes correction processing for feeding speed so that the accommodated amount of welding wire W in the wire buffer 41 is in the range of the first predetermined amount (step S12).

Figure 7:
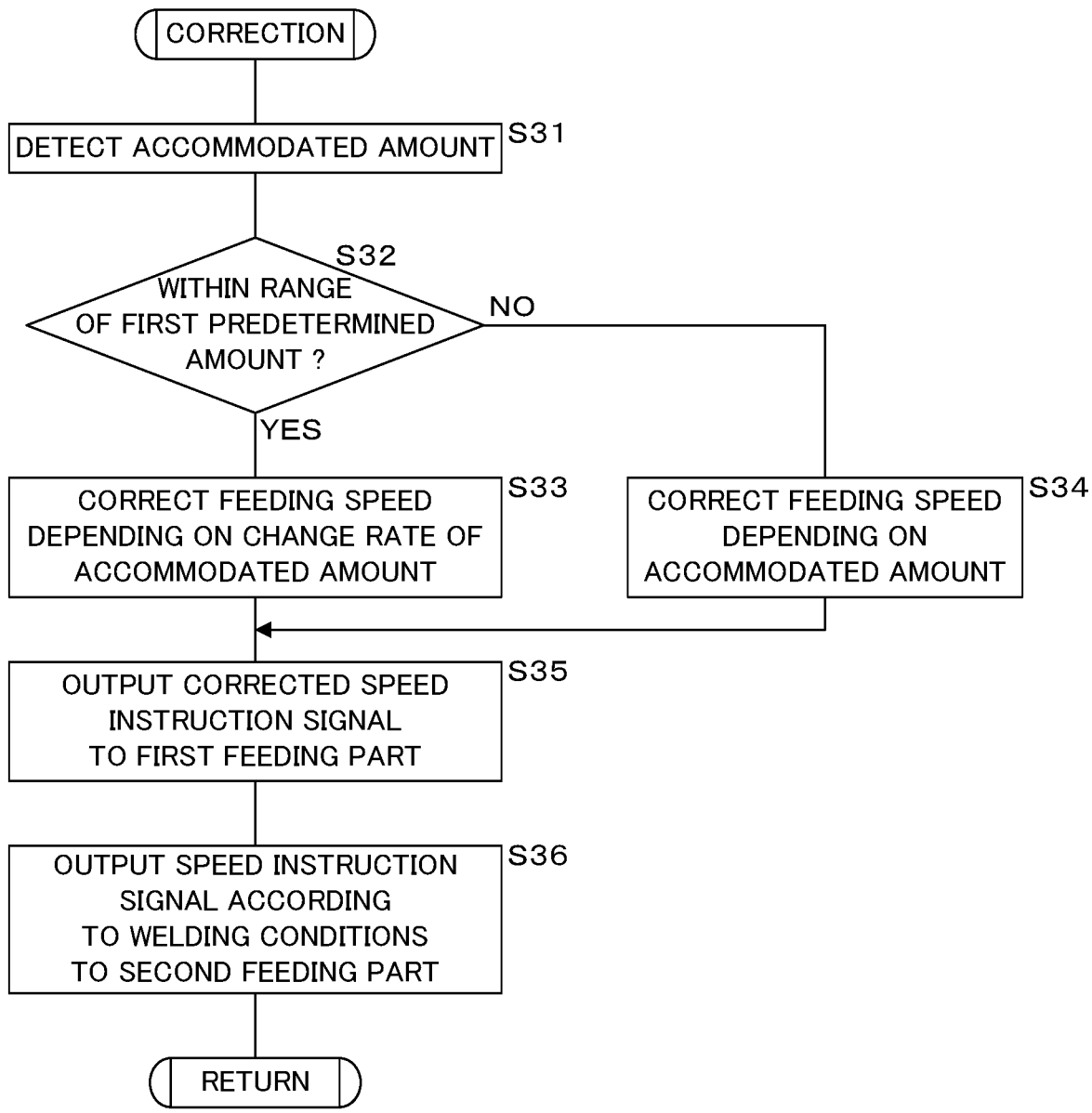
FIG. 7 is a flowchart illustrating a processing procedure concerning correction for feeding speed.

FIG. 7 is a flowchart illustrating a processing procedure concerning correction for feeding speed. The feed control unit 5b executes the following processing at step S12. The feed control unit 5b detects the accommodated amount of welding wire W by the accommodated amount detection unit

41*h* (step S31), and determines whether or not the detected accommodated amount is in the range of the first predetermined amount (step S32). If the accommodated amount of welding wire W is in the range of the first predetermined amount (YES at step S32), the feed control unit 5*b* corrects the feeding speed according to welding conditions depending on the change rate of the accommodated amount as illustrated in FIG. 5 (step S33). If the accommodated amount is out of the range of the first predetermined amount (NO at step S32), the feed control unit 5*b* corrects the feeding speed according to welding conditions depending on the difference between the upper limit value or lower limit value of the first predetermined amount and the accommodated amount, as illustrated in FIG. 4 (step S34). The feed control unit 5*b* that has finished the processing of step S33 or S34 outputs a speed instruction signal indicating the corrected feeding speed to the first feeding part 41*d* via the first speed instruction output unit 5*c* (step S35). Subsequently, the feed control unit 5*b* outputs a speed instruction signal indicating the feeding speed according to the welding conditions to the second feeding part 42 via the second speed instruction output unit 5*d* (step S36), and ends the processing of subroutine.

As described above, if the accommodated amount of welding wire W in the wire buffer 41 is out of the range of the first predetermined amount, the feed control unit 5*b* proportionally controls the feeding speed of welding wire W fed by the first feeding part 41*d*, and if it is within the range of the first predetermined amount, differential control may be performed on the feeding speed of welding wire W fed by the first feeding part 41*d*.

Referring again to FIG. 6, the processing procedure from step S12 on will now be described. The feed control unit 5*b* that has finished the processing at step S12 detects the accommodated amount of welding wire W by the accommodated amount detection unit 41*h* (step S13), and determines whether or not the detected accommodated amount is out of a normal range (step S14). The normal range includes an upper limit of normal which is larger than the upper limit value of the first predetermined amount and a lower limit of normal which is smaller than the lower limit value of the second predetermined amount.

If it is determined that the accommodated amount of welding wire W is within the normal range (NO at step S14), the feed control unit 5*b* returns the processing to step S11 to continue the feeding control. If it is determined that the accommodated amount of welding wire W is out of the normal range (YES at step S14), the feed control unit 5*b* abnormally stops the feeding of welding wire W by the first feeding part 41*d* and the second feeding part 42 (step S15). More specifically, the feed control unit 5*b* causes the first speed instruction output unit 5*c* and the second speed instruction output unit 5*d* to output speed instruction signals indicating that the feeding is stopped to the first feeding part 41*d* and the second feeding part 42, respectively. It is noted that the feed control unit 5*b* executing the processing at step S15 functions as a stop control unit that stops the feeding of welding wire W if the accommodated amount of welding wire W is more than the upper limit of normal which is larger than a predetermined amount, or if the accommodated amount of welding wire W is less than the lower limit of normal which is smaller than the predetermined amount.

The feed control unit 5*b* then executes adjustment processing for the accommodated amount of welding wire W (step S16).

Figure 8:
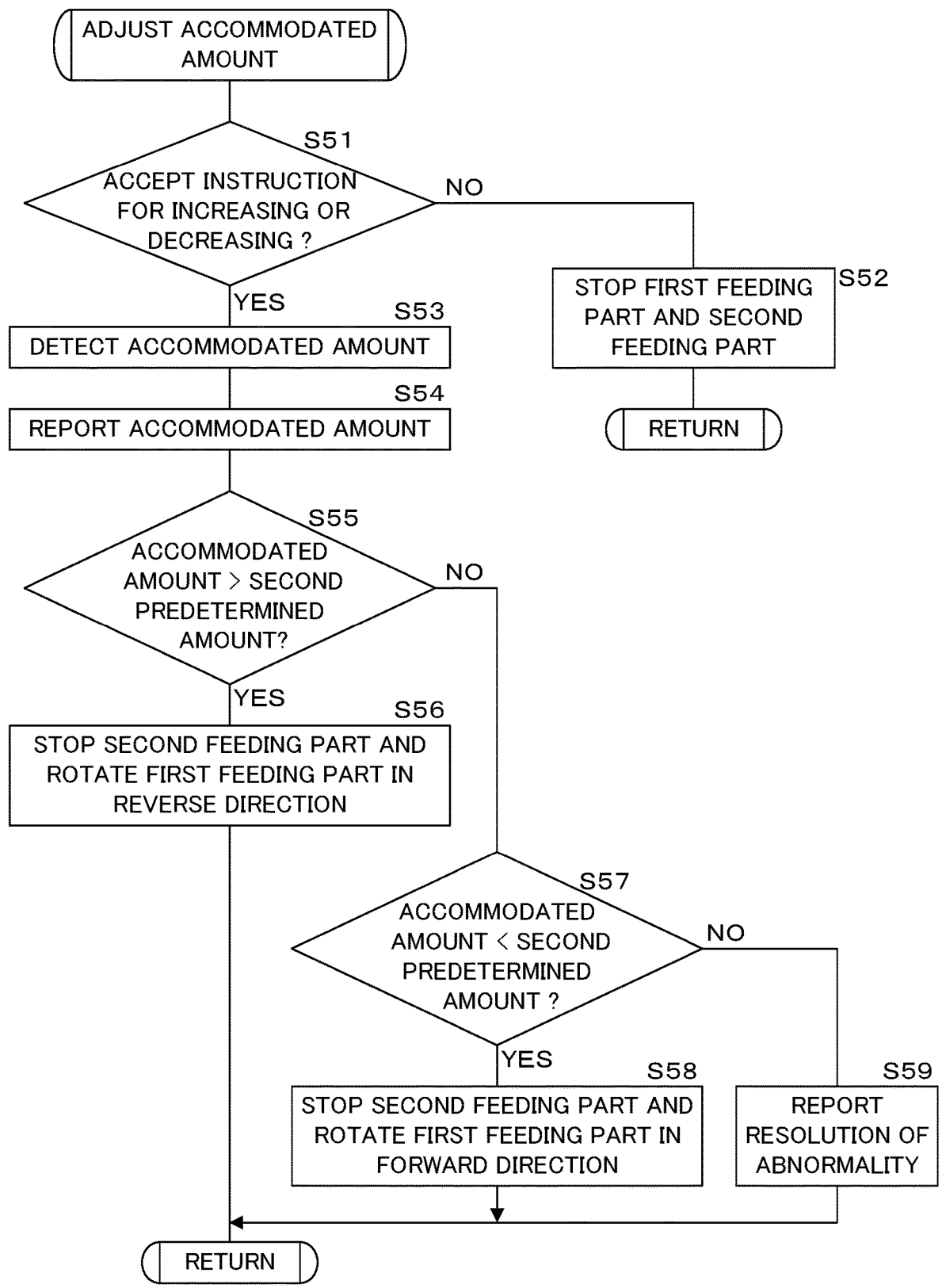
FIG. 8 is a flowchart illustrating a processing procedure concerning adjustment of the accommodated amount of welding wire.

FIG. 8 is a flowchart illustrating a processing procedure concerning adjustment of the accommodated amount of welding wire W. The feed control unit 5*b* executes the processing as described below at step S16. The feed control unit 5*b* causes the operation unit 5*g* to determine whether or not instructions for increasing or decreasing the accommodated amount of welding wire W are accepted (step S51). If the feeding of welding wire W is abnormally stopped, the feed control unit 5*b* and the operation unit 5*g* executing the processing of step S51 functions as an acceptance unit that accepts the instructions for increasing or decreasing the accommodated amount of welding wire W.

In the state where the feeding of welding wire W is abnormally stopped, the feed control unit 5*b* successively accepts instructions for increasing or decreasing through the operation unit 5*g*. For example, the user may give the instructions for increasing or decreasing successively or continuously by maintaining the state where the touch panel of the operation unit 5*g* is being pressed with a finger. When the finger of the user is released from the touch panel of the operation unit 5*g*, the feed control unit 5*b* is put into a state where no instructions for increasing or decreasing has been accepted.

At step S51, if it is determined that no instructions for increasing or decreasing has been accepted (NO at step S51), the feed control unit 5*b* stops the first feeding part 41*d* and the second feeding part 42 (step S52), and ends the processing of subroutine.

If it is determined that instructions for increasing or decreasing are accepted (YES at step S51), the feed control unit 5*b* causes the accommodated amount detection unit 41*h* to detect the accommodated amount of welding wire W (step S53), and reports the accommodated amount at the current time point by displaying the detected accommodated amount of welding wire W on the display unit 5*f* (step S54). If the feeding of welding wire W is abnormally stopped, the feed control unit 5*b* and the display unit 5*f* executing the processing of step S54 functions as an accommodated amount reporting unit that reports the accommodated amount of welding wire W.

The feed control unit 5*b* then determines whether or not the accommodated amount of welding wire W is more than the second predetermined amount (step S55). The second predetermined amount corresponds to the accommodated amount of welding wire W that allows the abnormally-stopped wire feeding device 4 to be restored and to normally restart the feeding of welding wire W. The second predetermined amount takes a range of the same accommodated amount as the first predetermined amount, for example. Moreover, in order to more stably restore the device from the abnormal state, the second predetermined amount may be set as a range included in the first predetermined amount.

If it is determined that the accommodated amount is more than the second predetermined amount (YES at step S55), the feed control unit 5*b* stops the second feeding part 42, rotates the first feeding part 41*d* in the reverse direction (step S56), and ends the processing of subroutine. Such control reduces the accommodated amount of welding wire W in the wire buffer 41.

If it is determined that the accommodated amount is not more than the second predetermined amount (NO at step S55), the feed control unit 5*b* determines whether or not the accommodated amount of welding wire W is less than the second predetermined amount (step S57). If it is determined that the accommodated amount is less than the second predetermined amount (YES at step S57), the feed control unit 5*b* stops the second feeding part 42, rotates the first feeding part 41*d* in the forward direction (step S58), and ends the processing of subroutine. Such control increases the accommodated amount of welding wire W in the wire buffer 41.

If it is determined that the accommodated amount is not less than the second predetermined amount (NO at step S57), i.e. that the accommodated amount is within the range of the second predetermined amount, the feed control unit 5b reports resolution of abnormality by displaying that the abnormality has been resolved (step S59), and ends the processing of subroutine. If the accommodated amount of welding wire W reaches the second predetermined amount which is in the range from the lower limit of normal to the upper limit of normal after the feeding of welding wire W is abnormally stopped, the feed control unit 5b and the display unit 5f executing the processing of step S59 function as an abnormality resolution reporting unit that reports that the abnormality has been resolved.

Figure 9:
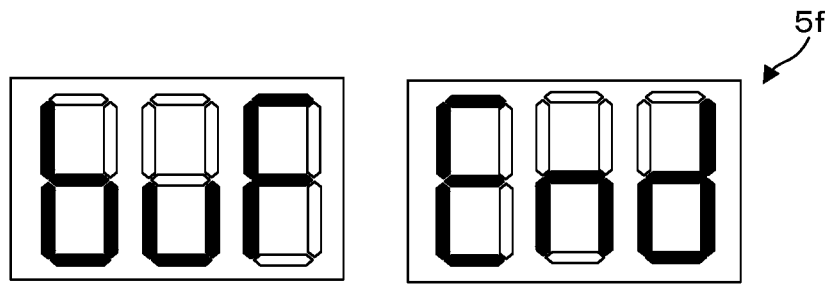
FIG. 9 is a schematic diagram illustrating an example of reporting for abnormality being resolved.

FIG. 9 is a schematic diagram illustrating an example of reporting for abnormality being resolved. The display unit 5f includes multiple seven-segment displays, as illustrated in FIG. 9. The display unit 5f includes, for example, a first display comprised of three seven-segment displays representing triple-digit numbers, and a second display configured similarly. In the case where the abnormality is resolved, the feed control unit 5b displays the characters of "buF" and "End" as illustrated in FIG. 9, to notify the user that the abnormality concerning the accommodated amount of welding wire W has been resolved. Such a display method is a mere example of a method of displaying or reporting the abnormality being resolved, and is not particularly limited thereto. Sound may be used to report that the abnormality has been resolved.

Referring again to FIG. 6, the feed control unit 5b that has finished the processing of step S16 determines whether or not a canceling operation is accepted through the operation unit 5g (step S17). It is noted that the feed control unit 5b and the operation unit 5g executing the processing of step S17 function as a cancellation acceptance unit that accepts the cancellation of abnormal stop.

If it is determined that the canceling operation has not been accepted (NO at step S17), the feed control unit 5b returns the processing to step S16. If it is determined that the canceling operation has been accepted (YES at step S17), the feed control unit 5b causes the accommodated amount detection unit 41h to detect the accommodated amount of welding wire W (step S18), and determines whether or not the accommodated amount is within the range of the second predetermined amount (step S19). If it is determined that the accommodated amount is within the range of the second predetermined amount (YES at step S19), the feed control unit 5b cancels the abnormally-stopped state (step S20), and ends the processing. Though it has been described here, for the purpose of illustration, that the processing is ended, the processing may be returned to step S11 to immediately restart feeding the welding wire W. In the case where the cancellation acceptance unit accepts cancellation, if the accommodated amount of welding wire W is the second predetermined amount in the range from the lower limit of normal to the upper limit of normal, the feed control unit 5b executing the processing of step S20 functions as a cancellation control unit that cancels the stopped state made by the stop control unit.

If it is determined that the accommodated amount is out of the range of the second predetermined amount (NO at step S19), the feed control unit 5b returns the processing to step S16.

As has been described above, with the use of the wire feeding device 4, arc welding device and wire feeding method according to Embodiment 1, if the feeding of welding wire W stops abnormally due to abnormality in the accommodated amount of welding wire W, the user may only perform operation of increasing or decreasing the accommodated amount through the operation unit 5g to return the accommodated amount of welding wire W in the wire buffer 41 to a proper value, and to restore the abnormally-stopped wire feeding device 4.

Moreover, in the case where the feeding of welding wire W is abnormally stopped, the first feeding part 41d is configured to be driven while the second feeding part 42 is being stopped, which can prevent a change in the state of the welding wire W on the welding torch 13 side of the second feeding part 42.

Furthermore, such a configuration is employed that the first feeding part 41d and the second feeding part 42 are driven only during a period when the user is performing operation for increasing or decreasing the accommodated amount through the operation unit 5g, so that the accommodated amount of welding wire W may safely be adjusted.

Furthermore, if the accommodated amount of welding wire W reaches the second predetermined amount, the first feeding part 41d and the second feeding part 42 may be stopped being driven.

Furthermore, even in the case where abnormality canceling operation is accepted, the abnormally-stopped state is canceled after confirming that the accommodated amount of welding wire W reaches the second predetermined amount, which can safely restart the feeding of welding wire W.

Furthermore, if the accommodated amount of welding wire W reaches the second predetermined amount, this is displayed on the display unit 5f for the user to recognize that the accommodated amount of welding wire W in the wire buffer 41 takes an appropriate value.

Furthermore, if the feeding of welding wire W is abnormally stopped, the accommodated amount of welding wire W is displayed on the display unit 5f for the user to check and adjust the accommodated amount.

Furthermore, as for the feeding of welding wire W using the wire buffer 41, the wire feeding device 4, arc welding device and wire feeding method according to Embodiment 1 produce the effects as described below.

The feed control unit 5b of the power supply device 5 outputs substantially identical speed instruction signals according to welding conditions to the first feeding part 41d and the second feeding part 42, to control the speed of feeding the welding wire W by the first feeding part 41d and the second feeding part 42. The first feeding part 41d and the second feeding part 42 rotate the rollers in accordance with speed control signals output from the power supply device 5, and feed the welding wire W at a required speed.

This can prevent a delay in following the feeding speed, which may be a problem in torque control, from occurring, and achieve a high response performance in wire feeding. Since the wire buffer 41 is provided, it is not necessary to highly precisely synchronize the welding wire W fed by the first feeding part 41d and the second feeding part 42, and still the welding wire W may stably be fed to the welding torch 13 at a required speed.

Furthermore, the welding wire W is accommodated into the wire buffer 41 in a state of being bent in an arc between the inlet part 41b and the outlet part 41c. Therefore, compared to the case where the welding wire W is largely bent in a shape such as a loop and is accommodated into the housing 41a, the feeding load may be reduced. Compared to the case where the welding wire W is accommodated in a loop, the internal structure of the housing 41a may be simplified.

Furthermore, as the first feeding part 41d and the second feeding part 42 are speed-controlled, the difference in the feeding speed may be suppressed to the minimum, and thus the housing 41a may be reduced in size.

In addition, even in the case where the feeding load of the welding wire W between the wire source 3 and the wire buffer 41 is large, the welding wire W may stably be fed from the wire buffer 41 to the welding torch 13. Even in the case, for example, where the wire source 3 is located at a position distant from the welding robot 1 and thus the first conduit cable 4a is long, the welding wire W may stably be fed to the welding torch 13.

Moreover, the amount of welding wire W accommodated in the housing 41a is monitored so that the first predetermined amount of welding wire W is accommodated in the wire buffer 41, which enables stable feeding of welding wire W from the wire buffer 41 to the welding torch 13.

More specifically, if the accommodated amount of welding wire W in the wire buffer 41 is out of the first predetermined range, proportional control is performed on the feeding speed of welding wire W fed by the first feeding part 41d. That is, if the accommodated amount of welding wire W is larger than the upper limit value, the accommodated amount is decreased by correcting the feeding speed of the first feeding part 41d to be lower. If, on the other hand, the accommodated amount of welding wire W is smaller than the lower limit value, the accommodated amount is increased by correcting the feeding speed of the first feeding part 41d to be higher. Even if a difference is generated in the speed of feeding the welding wire W between the first feeding part 41d and the second feeding part 42, the first predetermined amount of welding wire W is secured in the wire buffer 41, and the welding wire W may stably be fed to the welding torch 13.

Furthermore, some latitude is allowed as to the first predetermined amount to be accommodated in the wire buffer 41, which can prevent unnecessary variation in the feeding speed of welding wire W fed by the first feeding part 41d. In other words, the accommodation state of welding wire W in the wire buffer 41 may be stabilized.

Furthermore, if the accommodated amount of welding wire W in the wire buffer 41 is in the range of the first predetermined amount, differential control is performed on the feeding speed of welding wire W fed by the first feeding part 41d. Thus, if the amount of welding wire W accommodated in the wire buffer 41 is in the range of the first predetermined amount, the speed of feeding by the first feeding part 41d is controlled so that the accommodated amount is not changed from the current value, which can stabilize the accommodation state of the welding wire W in the wire buffer 41.

While Embodiment 1 described the example where the first feeding part 41d is located inside the housing 41a of the wire buffer 41, the first feeding part 41d and the wire buffer 41 may be formed as separate units. The position of the separate first feeding part 41d is not necessarily limited, and may be at the wire source 3.

While the example was described where the wire buffer 41 is arranged side by side with the welding robot 1, the position of the wire buffer 41 is not particularly limited thereto but may be at the arm 12 of the welding robot 1.

While the present embodiment described a configuration including a set of wire buffer 41 and first feeding part 41d in the wire feeding device 4, multiple sets of wire buffers 41 and first feeding parts 41d may be included.

Moreover, while the present embodiment described an example where the accommodated amount of welding wire W in the wire buffer 41 is adjusted when the feeding of welding wire W is abnormally stopped, it is also possible to accept increasing or decreasing of the accommodated amount at the time of normal operation and to automatically adjust the accommodated amount.

Furthermore, while the present embodiment described an example where instructions for increasing or decreasing are accepted by the operation unit 5g to adjust the accommodated amount when the feeding of welding wire W is abnormally stopped, the feed control unit 5b may automatically start the adjustment of the accommodated amount in the case of abnormal stopping.

While an example where the second feeding part 42 is stopped and the rollers of the first feeding part 41d are forwardly or inversely rotated to adjust the accommodated amount, the accommodated amount of welding wire W may also be adjusted by stopping the first feeding part 41d while the second feeding part 42 is being driven.

Moreover, the accommodated amount of welding wire W may also be adjusted by driving both the first feeding part 41d and the second feeding part 42.

Embodiment 2

As the arc welding device and the wire feeding device 4 according to Embodiment 2 are different from Embodiment 1 in the configuration of the power supply device 205, the difference will mainly be described below. Since the other configurations and effects are similar to those in Embodiment 1, corresponding parts are denoted by similar reference codes and detailed description thereof will not be repeated.

Figure 10:
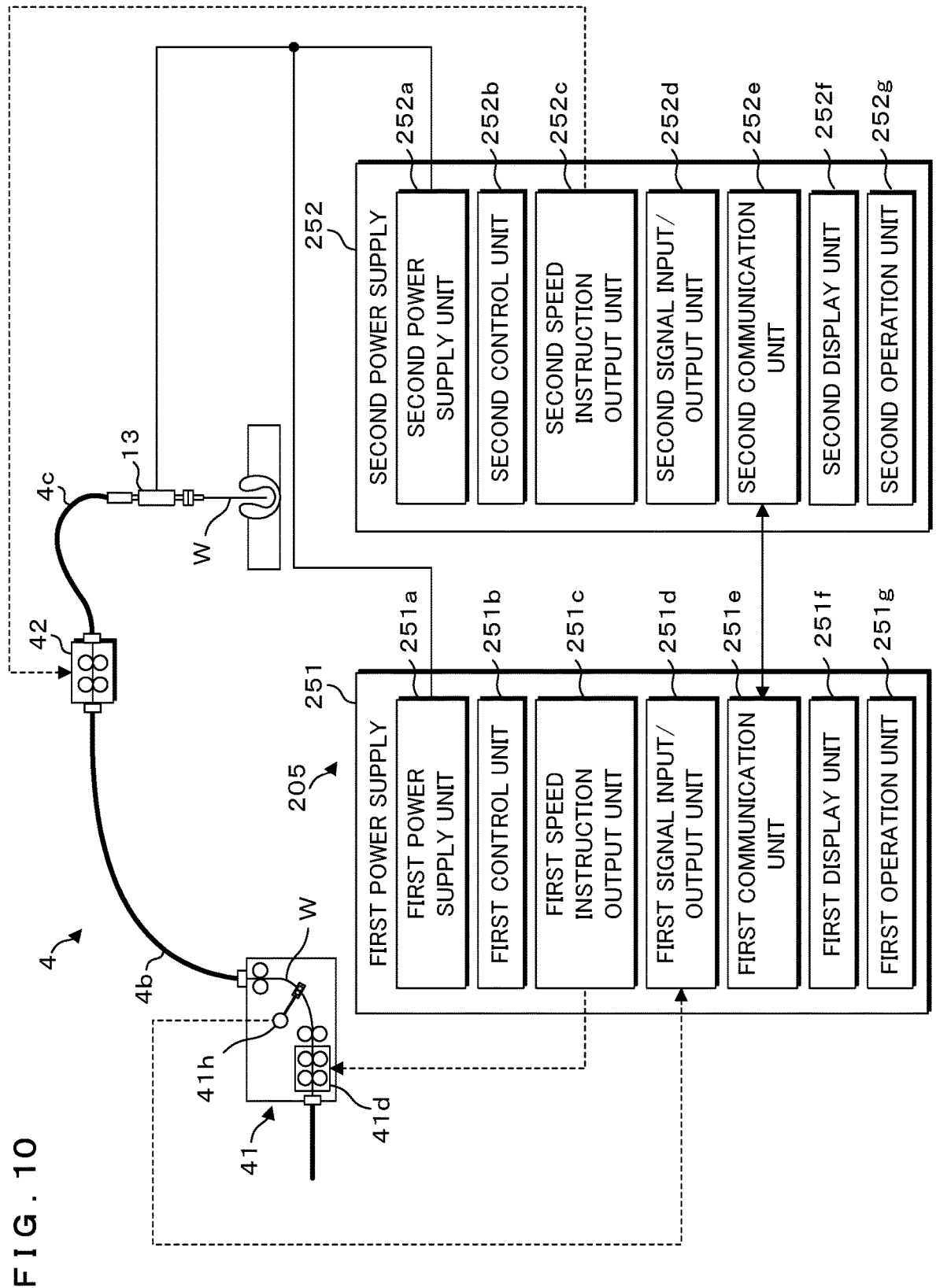
FIG. 10 is a schematic diagram illustrating a configuration example of an arc welding system according to Embodiment 2.

FIG. 10 is a schematic diagram illustrating a configuration example of an arc welding system according to Embodiment 2. The power supply device 205 according to Embodiment 2 includes a first power supply 251 and a second power supply 252 that are connected in parallel to a common load concerning arc welding, to feed electricity to the load, and is able to output large current. The power supplies 251 and 252 are connected with each other by a communication line.

The second power supply 252 transmits PWM control information to the first power supply 251 through a communication line, to function as a master power supply that controls the outputs of the first and power supplies 251 and 252. The first power supply 251 receives the PWM control information transmitted from the second power supply 252, and functions as a slave power supply that controls the output based on the received PWM control information.

The second power supply 252 includes a second power supply unit 252a, a second control unit 252b, a second speed instruction output unit 252c, a second signal input/output unit 252d, a second communication unit 252e, a second display unit 252f and a second operation unit 252g. The second power supply unit 252a, second control unit 252b, second speed instruction output unit 252c, second display unit 252f and second operation unit 252g are configured similarly to those of the power supply device 5 described in Embodiment 1. The second control unit 252b causes the second speed instruction output unit 252c to output a speed instruction signal to the second feeding part 42, to control the speed of feeding the welding wire W by the second feeding part 42.

The second signal input/output unit 252d is a terminal connected to an external device, and receives input/output of signals. To the terminal, an operation device for operating an arc welding device is connected, for example.

The second communication unit 252e is a communication circuit for transmitting and receiving various information to/from the first power supply 251. The second communication unit 252e transmits and receives information according to the host control interface (HCI) communication protocol, for example.

The second power supply 252 with the operation mode being a master power mode transmits the speed information of the second feeding part 42 and the PWM control information calculated at the second power supply unit 252a of its own device to the first power supply 251 operating in a slave mode.

The first power supply 251 is configured similarly to the second power supply 252, and includes a first power supply unit 251a, a first control unit 251b, a first speed instruction output unit 251c, a first signal input/output unit 251d, a first communication unit 251e, a first display unit 251f and a first operation unit 251g. The first power supply 251 receives, by the first communication unit 251e, the speed information and PWM control information transmitted from the second power supply 252 operating in the master power mode. The first power supply unit 251a outputs welding current based on the received PWM control information.

An accommodated amount detection unit 41h is connected to the first signal input/output unit 251d, and a signal indicating the result of detection performed by the accommodated amount detection unit 41h is input to the first signal input/output unit 251d. It is noted that the first signal input/output unit 251d is configured similarly to the second signal input/output unit 252d. In the case where the first power supply 251 is used as a master power supply, an external device, e.g., an operation device for operating the arc welding device, may be connected to the first signal input/output unit 251d.

The first control unit 251b corrects the speed information received at the first communication unit 251e based on the signals input to the first signal input/output unit 251d, and outputs speed instruction signals indicating the corrected speed information from the first speed instruction output unit 251c to the first feeding part 41d. The method of correcting the feeding speed of the first feeding part 41d is as described in Embodiment 1, and the first control unit 251b causes the first speed instruction output unit 251c to output a speed instruction signal to the first feeding part 41d, to control the speed of the welding wire W fed by the first feeding part 41d.

A processing procedure concerning the feeding speed control for the welding wire W as well as abnormal stopping and restoring will now be described.

Figure 11:
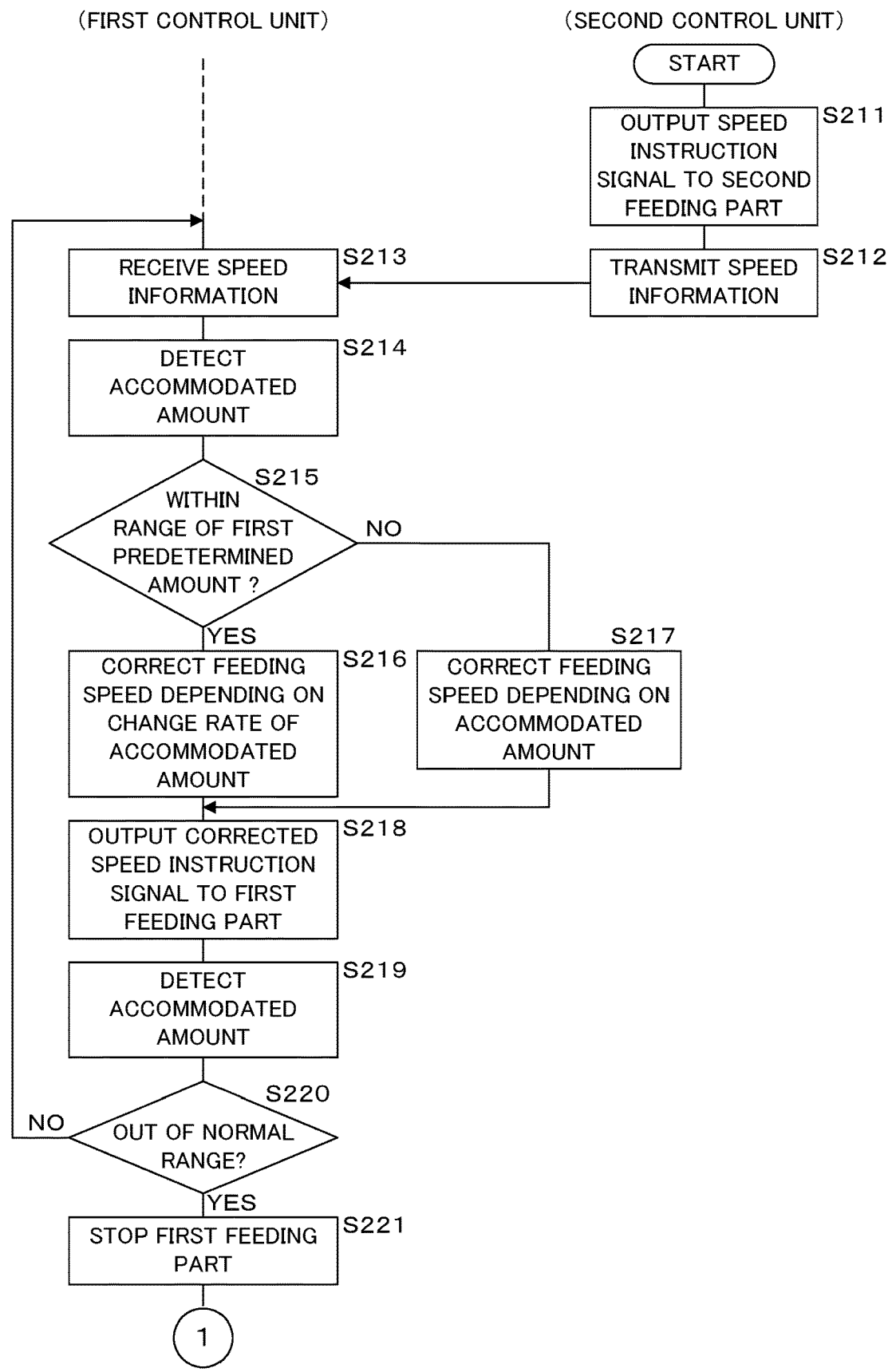
FIG. 11 is a flowchart illustrating a processing procedure for the first control unit and the second control unit according to Embodiment 2.
Figure 12:
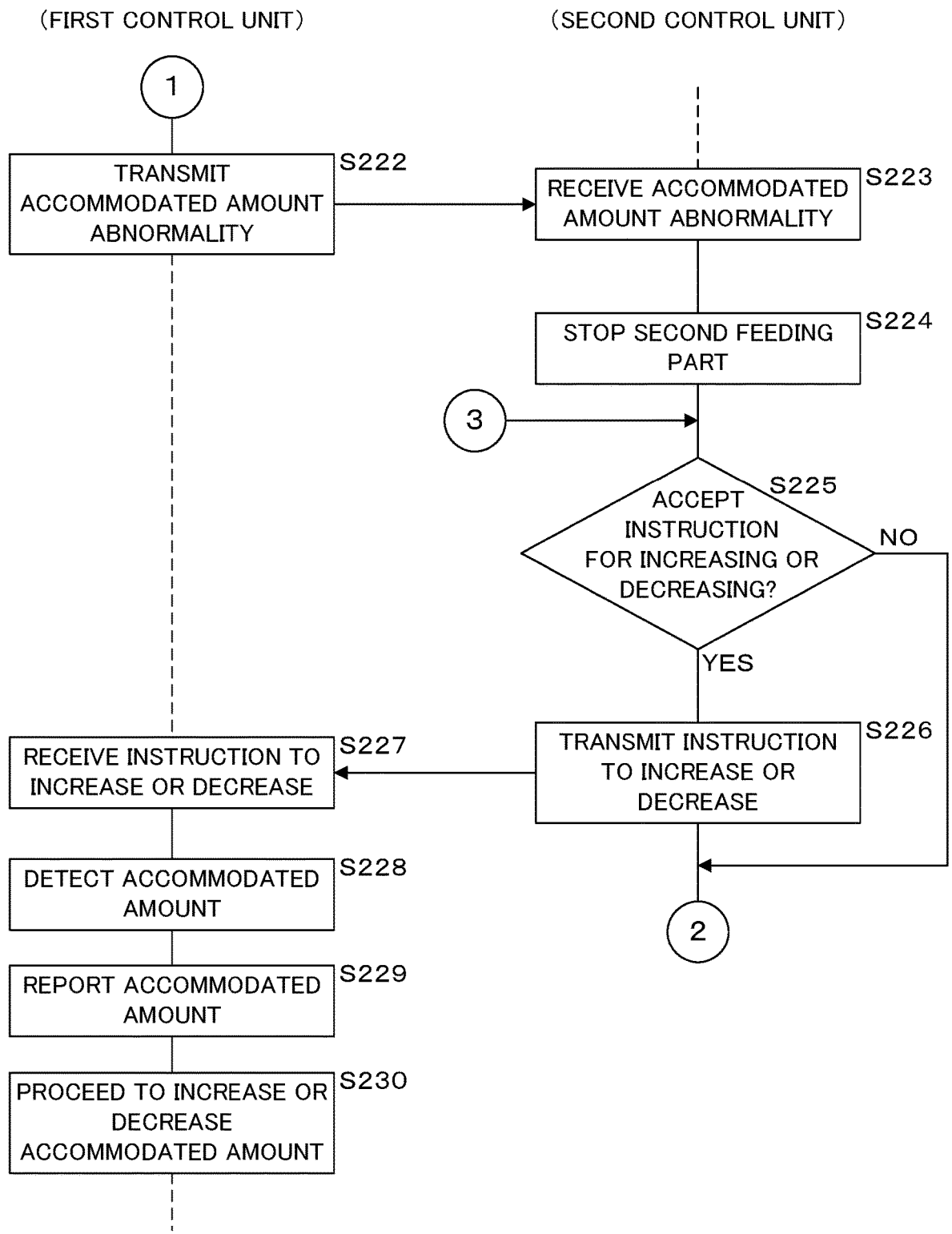
FIG. 12 is a flowchart illustrating a processing procedure for the first control unit and the second control unit according to Embodiment 2.
Figure 13:
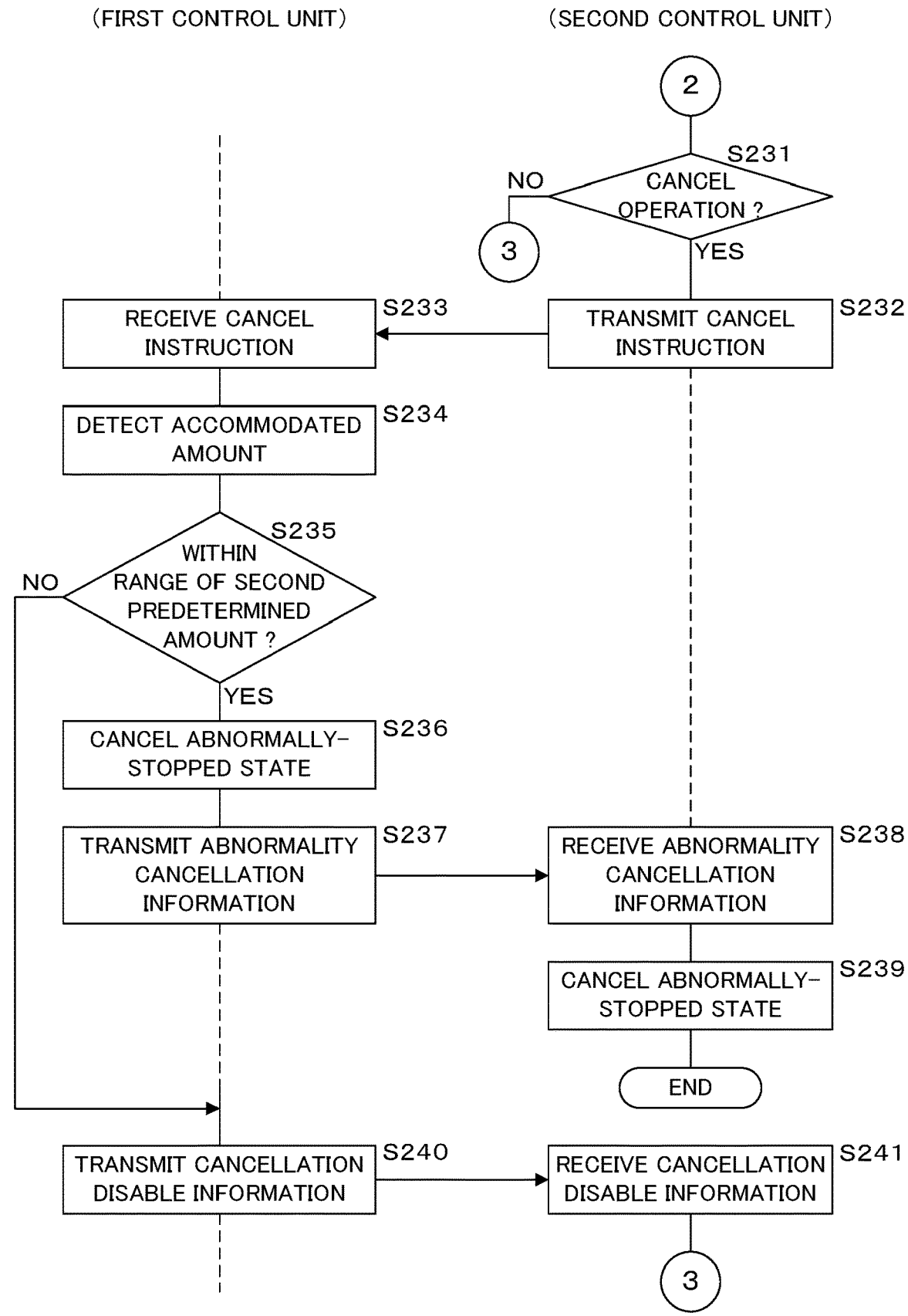
FIG. 13 is a flowchart illustrating a processing procedure for the first control unit and the second control unit according to Embodiment 2.

FIGS. 11 to 13 show a flowchart illustrating a processing procedure for the first control unit 251b and the second control unit 252b according to Embodiment 2. First, the second control unit 252b of the second power supply 252 outputs a speed instruction signal indicating the feeding speed in accordance with the welding condition to the second feeding part 42 through the second speed instruction output unit 252c, to control the speed of feeding by the second feeding part 42 (step S211). Subsequently, the second control unit 252b transmits the speed information indicating the feeding speed of the second feeding part 42 to the first power supply 251 through the second communication unit 252e (step S212).

The first control unit 251b of the first power supply 251 receives, by the first communication unit 251e, the speed information transmitted from the second power supply 252 (step S213). Subsequently, the first control unit 251b causes the accommodated amount detection unit 41h to detect the accommodated amount of welding wire W (step S214), and determines whether or not the accommodated amount is within the range of the first predetermined amount (step S215). If it is determined that the accommodated amount is in the range of the first predetermined amount (YES at step S215), the first control unit 251b corrects the feeding speed indicated by the received speed information in accordance with the change rate of the accommodated amount as illustrated in FIG. 5 (step S216). If it is determined that the accommodated amount is out of the range of the first predetermined amount (NO at step S215), the first control unit 251b corrects the feeding speed indicated by the received speed information in accordance with the difference between the upper limit value or lower limit value of the first predetermined amount and the accommodated amount, as illustrated in FIG. 4 (step S217). The first control unit 251b that has finished the processing of step S216 or S217 outputs a speed instruction signal indicating the corrected feeding speed to the first feeding part 41d via the first speed instruction output unit 251c (step S218).

Subsequently, the first control unit 251b of the first power supply 251 causes the accommodated amount detection unit 41h to detect the accommodated amount of welding wire W (step S219), and determines whether or not the detected accommodated amount is out of a normal range (step S220). If it is determined that the accommodated amount of welding wire W is within the normal range (NO at step S220), the first control unit 251b returns the processing to step S213 to continue the feeding control.

If it is determined that the accommodated amount of welding wire W is out of the normal range (YES at step S220), the first control unit 251b abnormally stops the feeding of welding wire W by the first feeding part 41d (step S221). More specifically, the first control unit 251b causes the first speed instruction output unit 251c to output a speed instruction signal indicating that the feeding is stopped to the first feeding part 41d.

Subsequently, the first control unit 251b transmits accommodated amount abnormality information indicating that the accommodated amount of welding wire W is abnormal to the second power supply 252 through the first communication unit 251e (step S222). The second control unit 252b of the second power supply 252 receives, by the second communication unit 252e, the accommodated amount abnormality information transmitted from the first power supply 251 (step S223). The second control unit 252b that has received such information abnormally stops the feeding of welding wire W fed by the second feeding part 42 (step S224). More specifically, the second control unit 252b causes the second speed instruction output unit 252c to output a speed instruction signal indicating that the feeding is stopped to the second feeding part 42.

Subsequently, the second control unit 252b determines whether or not instructions for increasing or decreasing the accommodated amount of welding wire W are accepted by the second operation unit 252g (step S225). If it is determined that the instructions for increasing or decreasing has been accepted (YES at step S225), the feed control unit 5b transmits the information for providing instructions to increase or decrease the accommodated amount of welding wire W, to the first power supply 251 through the second communication unit 252e (step S226).

The first control unit 251b of the first power supply 251 receives, by the first communication unit 251e, information on instructions for increasing or decreasing transmitted from the second power supply 252 (step S227). The first control unit 251*b* that has received the information on the instructions for increasing or decreasing causes the accommodated amount detection unit 41*h* to detect the accommodated amount of welding wire W (step S228), and reports the accommodated amount at the current time point by displaying the detected accommodated amount of welding wire W on the display unit 251*f* or 252*f* (step S229). In the case where the accommodated amount is displayed on the second display unit 252*f*, the first control unit 251*b* transmits the information indicating the accommodated amount to the second power supply 252 through the first communication unit 251*e*, to display the accommodated amount on the second power supply 252 side.

Subsequently, the first control unit 251*b* executes processing similar to steps S55 to S59 in Embodiment 1, to drive the first feeding part 41*d* and to increase or decrease the accommodated amount of welding wire W in the wire buffer 41 (step S230).

If, on the other hand, it is determined that the instructions for increasing or decreasing has not been accepted at step S225 (NO at step S225), the second control unit 252*b* of the second power supply 252 that has finished the step S226 determines whether or not a canceling operation is accepted by the second operation unit 252*g* (step S231). If it is determined that the canceling operation has not been accepted (NO at step S231), the first control unit 251*b* returns the processing to step S225. If it is determined that the canceling operation has been accepted (YES at step S231), the second control unit 252*b* transmits cancel instruction information indicating instructions for cancellation to the first power supply 251 through the second communication unit 252*e* (step S232).

The first control unit 251*b* of the first power supply 251 receives cancel instruction information by the first communication unit 251*e* (step S233). The first control unit 251*b* that has received the cancel instruction information causes the accommodated amount detection unit 41*h* to detect the accommodated amount of welding wire W (step S234), and determines whether or not the accommodated amount is within the range of the second predetermined amount (step S235). If it is determined that the accommodated amount is within the range of the second predetermined amount (YES at step S235), the first control unit 251*b* cancels the abnormally-stopped state (step S236), and transmits the abnormality cancellation information instructing to cancel the abnormal state to the second power supply 252 through the first communication unit 251*e* (step S237).

The second control unit 252*b* of the second power supply 252 receives the abnormality cancellation information transmitted from the first power supply 251 (step S238). The first power supply 251 that has received the abnormality cancellation information cancels the abnormally-stopped state (step S239), and ends the processing.

If it is determined, at step S235, that the accommodated amount is out of the range of the second predetermined amount (NO at step S235), the first control unit 251*b* transmits cancellation disable information indicating that the cancellation cannot be performed to the second power supply 252 through the first communication unit 251*e* (step S240).

The second control unit 252*b* of the second power supply 252 receives the cancellation disable information transmitted from the first power supply 251 (step S241). The second control unit 252*b* that has received the cancellation disable information returns the processing to step S225.

With the wire feeding device 4 and arc welding device according to Embodiment 2 that are configured as described above, even in the configuration where the first power supply 251 and the second power supply 252 are each provided with only one port for outputting speed instructions to the first feeding part 41*d* or the second feeding part 42, i.e. the first speed instruction output unit 251*c* or the second speed instruction output unit 252*c*, the speed of feeding the welding wire W by both the first feeding part 41*d* and the second feeding part 42 may be controlled.

While Embodiment 2 described the configuration where the first power supply 251 and the second power supply 252 respectively control the speed for the first feeding part 41*d* and the second feeding part 42, three or more power supplies may also be connected in parallel. In such a case, additional sets of wire buffers and the first feeding parts 41*d* may be provided, and multiple power supplies may control the speed of feeding the welding wire W by multiple first feeding parts 41*d* and second feeding parts 42.

Embodiment 2 further described the configuration where the first power supply 251 serving as a slave power supply controls the feeding of the first feeding part 41*d* and the second power supply 252 serving as a master power supply controls the feeding of the second feeding part 42. It is, however, also possible for the second power supply 252 of the master power supply to control the feeding of the first feeding part 41*d*, and for the first power supply 251 of the slave power supply to control the feeding of the second feeding part 42.

Embodiment 3

As an arc welding device and a wire feeding device 304 according to Embodiment 3 are different from those in Embodiment 1 in that the wire source 3 is further provided with a third feeding part 343, the difference will mainly be described below. Since the other configurations and effects are similar to those in Embodiment 1, corresponding parts are denoted by similar reference codes and detailed description thereof will not be repeated.

Figure 14:
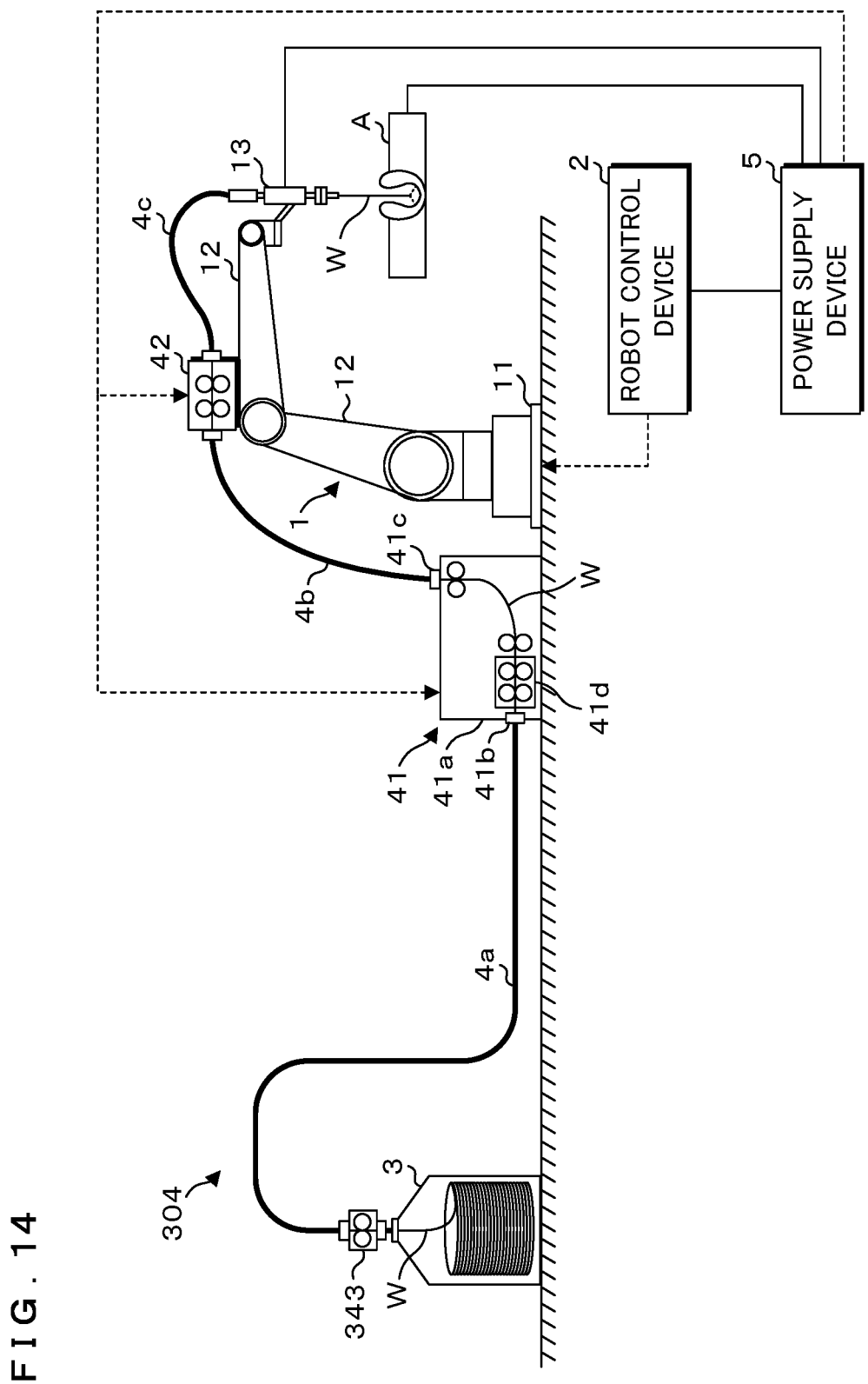
FIG. 14 is a schematic diagram illustrating a configuration example of an arc welding system according to Embodiment 3.

FIG. 14 is a schematic diagram illustrating a configuration example of an arc welding system according to Embodiment 3. The wire feeding device 304 according to Embodiment 3 is provided with a third feeding part 343 that pulls out the welding wire W from the wire source 3 and pushes it out to the wire buffer 41. The third feeding part 343 is provided with, for example, rollers on which torque control is performed, and the feeding of welding wire W fed by the third feeding part 343 is controlled by the power supply device 5.

According to Embodiment 3, the third feeding part 343 allows for more stable feeding of welding wire W to the welding torch 13.

It is to be understood that the embodiments disclosed here is illustrative in all respects and not restrictive. The scope of the present disclosure is defined by the appended claims, and all changes that fall within the meanings and the bounds of the claims, or equivalence of such meanings and bounds are intended to be embraced by the claims.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. A wire feeding device that feeds welding wire from a wire source to a welding torch, comprising:
   a wire buffer that is configured to temporarily accommodate the welding wire fed from the wire source and to feed the accommodated welding wire to the welding torch;
   a first feeder having a pair of rollers that are opposed to each other and configured to feed the welding wire from the wire source to the wire buffer;
   a second feeder having a pair of rollers that are opposed to each other and configured to feed the welding wire accommodated in the wire buffer to the welding torch;
   a detector having a rotary position sensor or a limit switch and configured to detect an accommodated amount of welding wire accommodated in the wire buffer;
   a feed control circuit configured to control speed of feeding the welding wire fed by the first feeder and the second feeder so that a first predetermined range of welding wire is accommodated in the wire buffer, based on a detection result obtained by the detector, and configured to stop feeding of welding wire if the accommodated amount of welding wire is more than an upper limit of normal which is larger than the first predetermined range, or if the accommodated amount of welding wire is less than a lower limit of normal which is smaller than the first predetermined range; and
   an operation panel configured to accept instructions from a user for increasing or decreasing the accommodated amount of welding wire if feeding of welding wire is abnormally stopped,
   wherein
   the feed control circuit is configured to control the speed of feeding the welding wire fed by the first feeder or the second feeder so that a difference is generated in the feeding speed of the first feeder and the second feeder and so that the accommodated amount of welding wire is in a second predetermined range which is included in the first predetermined range during a period when the operation panel is accepting the instructions until the accommodated amount of welding wire reaches the second predetermined range, after the feeding of welding wire was abnormally stopped;
   the wire feeding device comprises a display configured to report resolution of abnormality to the user if the accommodated amount of welding wire reaches the second predetermined range after the feeding of the welding wire was abnormally stopped;
   the operation panel is configured to accept cancellation of abnormal stop; and
   the feed control circuit is configured to cancel a stopped state caused by the feed control circuit in a case where the accommodated amount of welding wire reaches the second predetermined range and cancellation is accepted by the operation panel.

2. The wire feeding device according to claim 1, wherein in a case where the feeding of welding wire is abnormally stopped and where the operation panel accepts the instructions for increasing or decreasing, the feed control circuit controls feeding performed by the first feeder so that,
   if the accommodated amount of welding wire is less than the lower limit of normal, the second feeder is stopped and the welding wire is fed to the wire buffer, and
   if the accommodated amount of welding wire is more than the upper limit of normal, the second feeder is stopped and the welding wire is fed back to the wire source from the wire buffer.

3. The wire feeding device according to claim 1, wherein the operation panel successively accepts the instructions for increasing or decreasing, and
   in a case where the feeding of welding wire was abnormally stopped, the feed control circuit controls the feeding of welding wire by the first feeder or the second feeder during the period when the operation panel is accepting the instructions for increasing or decreasing, and stops the first feeder and the second feeder during a period when the operation panel is not accepting the instructions for increasing or decreasing.

4. The wire feeding device according to claim 1, wherein the display reports the accommodated amount of welding wire in a case where the feeding of welding wire was abnormally stopped.

5. An arc welding device of a consumable electrode type, comprising:
   the wire feeding device according to claim 1; and
   a power supply device that feeds welding current to welding wire fed to a base material by the wire feeding device.

6. The arc welding device according to claim 5, wherein the power supply device includes a first power supply and a second power supply that are connected in parallel,
   the feed control circuit includes
      a first control circuit that is located at the first power supply and that controls speed of feeding by the first feeder, and
      a second control circuit that is located at the second power supply and that controls speed of feeding by the second feeder, and
   the first power supply and the second power supply perform communication to control the speed of feeding of welding wire by the first feeder and the second feeder.

7. A wire feeding method of feeding welding wire from a wire source to a welding torch, comprising:
   preparing a wire buffer that is configured to temporarily accommodate the welding wire fed from the wire source and to feed the accommodated welding wire to the welding torch, a first feeder having a pair of rollers that are opposed to each other and feed the welding wire at the wire source to the wire buffer, and a second feeder having a pair of rollers that are opposed to each other and feed the welding wire accommodated in the wire buffer to the welding torch;
   detecting, with a detector having a rotary position sensor or a limit switch, an accommodated amount of welding wire accommodated in the wire buffer;
   controlling speed of feeding the welding wire fed by the first feeder and the second feeder so that a first predetermined range of welding wire is accommodated in the wire buffer, based on a detection result obtained by the detector;
   stopping the feeding of welding wire if the accommodated amount of welding wire is more than an upper limit of normal which is larger than the first predetermined range, or if the accommodated amount of welding wire is less than a lower limit of normal which is smaller than the first predetermined range;

accepting, with an operation panel, instructions from a user for increasing or decreasing an accommodated amount of welding wire if feeding of welding wire is abnormally stopped;

controlling, with a feed control circuit, the speed of feeding welding wire by the first feeder or the second feeder so that a difference is generated in the feeding speed of the first feeder and the second feeder and so that the accommodated amount of welding wire is in a second predetermined range which is included in the first predetermined range during a period when the operation panel is accepting the instructions until the accommodated amount of welding wire reaches the second predetermined range, after the feeding of welding wire was abnormally stopped;

reporting resolution of abnormality to the user if the accommodated amount of welding wire reaches the second predetermined range after the feeding of the welding wire was abnormally stopped;

accepting cancellation of abnormal stop by the operation panel; and cancelling a stopped state caused by the feed control circuit in a case where the accommodated amount of welding wire reaches the second predetermined range and cancellation is accepted by the operation panel.

* * * * *